US012483514B2

(12) United States Patent
Sathasivan et al.

(10) Patent No.: US 12,483,514 B2
(45) Date of Patent: *Nov. 25, 2025

(54) SYSTEMS AND METHODS FOR ADAPTIVE MULTI-SYSTEM OPERATIONS WITH SMART ROUTING PROTOCOLS

(71) Applicant: The Western Union Company, Denver, CO (US)

(72) Inventors: Sundaresh Sathasivan, Denver, CO (US); Manjot Sohi, San Jose, CA (US); Charmi Shah, San Carlos, CA (US); Sanjay Sankolli, Austin, TX (US); Ajit Kulkarni, Pune (IN); Praveen Kumar Nagle, Pune (IN); Dattatreya Akella, San Francisco, CA (US); Sandipan Pal, Bengaluru (IN); Dhanya Nair, Pune (IN)

(73) Assignee: The Western Union Company, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,683

(22) Filed: Apr. 15, 2024

(65) Prior Publication Data

US 2024/0356861 A1    Oct. 24, 2024

Related U.S. Application Data

(63) Continuation of application No. 18/077,688, filed on Dec. 8, 2022, now Pat. No. 11,979,333.

(Continued)

(51) Int. Cl.
*G06F 13/00*    (2006.01)
*H04L 47/125*    (2022.01)
(Continued)

(52) U.S. Cl.
CPC .......... *H04L 47/70* (2013.01); *H04L 47/125* (2013.01); *H04L 67/568* (2022.05)

(58) Field of Classification Search
CPC ...... H04L 47/70; H04L 47/125; H04L 67/568
(Continued)

(56) References Cited

U.S. PATENT DOCUMENTS 9,934,671 B1    4/2018    Anderson
10,619,760 B2    4/2020    Anderson
(Continued)

*Primary Examiner* — Kenneth R Coulter
(74) *Attorney, Agent, or Firm* — Kilpatrick Townsend & Stockton LLP

(57) ABSTRACT

Systems, methods, and machine-readable media facilitate adaptive multi-system operations. Electronic communications from resource-controlling systems and/or monitoring devices may be monitored to identify signals corresponding to processes performed by the resource-controlling systems, resource capacities of resources controlled by the resource-controlling systems, and states of the resource-controlling systems. System interactions that correspond to a defined event may be detected. A protocol that includes parameter constraints mapped to the defined event identified. Operating conditions of the resource-controlling systems and/or metrics of processes performed may be determined based on the monitoring. A subset of the resource-controlling systems may be identified as a function of the operating conditions and/or the metrics. A resource-controlling system may be caused to allocate corresponding resources and perform the processes in accordance with the protocol.

20 Claims, 7 Drawing Sheets

Related U.S. Application Data

(60) Provisional application No. 63/287,351, filed on Dec. 8, 2021.

(51) Int. Cl.
*H04L 47/70* (2022.01)
*H04L 67/568* (2022.01)

(58) Field of Classification Search
USPC ........ 709/226, 225, 224, 230, 235; 718/105, 718/102, 100
See application file for complete search history.

(56) References Cited

U.S. PATENT DOCUMENTS

| | | |
|---|---|---|
| 10,877,465 B2 | 12/2020 | Nixon et al. |
| 11,979,333 B2 * | 5/2024 | Sathasivan ............ H04L 47/125 |
| 2018/0112795 A1 | 4/2018 | Anderson |
| 2018/0113442 A1 | 4/2018 | Nixon et al. |

* cited by examiner

SYSTEMS AND METHODS FOR ADAPTIVE MULTI-SYSTEM OPERATIONS WITH SMART ROUTING PROTOCOLS

CROSS-REFERENCE TO RELATED APPLICATIONS

This application is a continuation of U.S. application Ser. No. 18/077,688 by Sathasivan et al., entitled "SYSTEMS AND METHODS FOR ADAPTIVE MULTI-SYSTEM OPERATIONS WITH SMART ROUTING PROTOCOLS," filed Dec. 8, 2022, now U.S. Pat. No. 11,979,333, issued May 7, 2024, and claims priority to U.S. Patent Application No. 63/287,351 by Sathasivan et al., entitled "SYSTEMS AND METHODS FOR ADAPTIVE MULTI-SYSTEM OPERATIONS WITH SMART ROUTING PROTOCOLS," filed Dec. 8, 2021, each of which is incorporated by reference herein for all purposes.

FIELD

Disclosed embodiments according to the present disclosure relate generally to cooperative multi-system operations, and in particular to systems, methods, and computer-readable media for adaptive multi-system operations in conformance with smart routing protocols.

BACKGROUND

Cooperative multi-system operations over networks and in various locations around the world can be encumbered by various needs. Quantities and capacities of systems and resources may be limited, which may limit an extent to which resources may be available for resource transfers, resource accesses, service requests, service provisioning, and other operations at a requested time. Among other things, resource access requests may require verification of credentials, codes, and information that are needed to determine whether resource access is to be granted, but additional constraints may also be required depending on the context and a variety of factors, including locations of the systems and devices. Such limitations and constraints may result in enormous technical challenges, especially when disruptive events impact system availability and performance. The inflexibility of conventional systems to address changing needs and contexts can require substantial, resource-consuming effort and time to, for example, change hardcoding, change or create numerous templates, and reconfigure systems. The lack of flexibility and speed to address the changes compromises outcomes for the collection of the systems and user devices.

Thus, there is a need to solve these problems and provide for systems, methods, and computer-readable media for adaptive multi-system operations in conformance with smart routing protocols. These and other needs are addressed by the present disclosure.

BRIEF SUMMARY

Certain embodiments according to the present disclosure relate generally to cooperative multi-system operations, and in particular to systems, methods, and computer-readable media for adaptive multi-system operations in conformance with smart routing protocols.

In one aspect, a system to facilitate adaptive multi-system operations is disclosed. The system may include one or more interfaces. The one or more interfaces may receive electronic communications from resource-controlling systems. The one or more interfaces may transmit electronic communications to the resource-controlling systems. The one or more interfaces may receive electronic communications from endpoint devices and/or agent devices. The one or more interfaces may transmit electronic communications to the endpoint devices and/or the agent devices. The system may include a resource monitor that perform one or a combination of the following. Electronic communications, received via the one or more interfaces, from the resource-controlling systems and/or monitoring devices may be monitored to identify signals. The signals may correspond to processes performed by the resource-controlling systems, resource capacities of resources controlled by the resource-controlling systems, and/or states of the resource-controlling systems. One or more system interactions that correspond to a defined event may be detected. The defined event may correspond to a device interaction or data change caused with respect to at least one remote system, at least one endpoint device, and/or at least one agent device. The system may include one or more processors that perform operations that may include one or a combination of the following. A protocol that includes parameter constraints mapped to the defined event may be identified. One or more operating conditions of one or more of the resource-controlling systems and/or one or more metrics of one or more processes performed by one or more of the resource-controlling systems may be determined based at least in part on the monitoring. A subset of the resource-controlling systems may be identified at least partially as a function of the one or more operating conditions and/or the one or more metrics. At least one resource-controlling system of the subset of the resource-controlling systems may be caused to allocate corresponding resources and perform the one or more processes in accordance with the protocol.

In another aspect, a method to facilitate adaptive multi-system operations is disclosed. The method may include one or a combination of the following. Electronic communications, received via one or more interfaces, from resource-controlling systems and/or monitoring devices may be monitored to identify signals. The signals may correspond to processes performed by the resource-controlling systems, resource capacities of resources controlled by the resource-controlling systems, and/or states of the resource-controlling systems. One or more system interactions that correspond to a defined event may be detected. The defined event may correspond to a device interaction or data change caused with respect to at least one remote system, at least one endpoint device, and/or at least one agent device. A protocol that includes parameter constraints mapped to the defined event may be identified. One or more operating conditions of one or more of the resource-controlling systems and/or one or more metrics of one or more processes performed by one or more of the resource-controlling systems may be determined based at least in part on the monitoring. A subset of the resource-controlling systems may be identified at least partially as a function of the one or more operating conditions and/or the one or more metrics. At least one resource-controlling system of the subset of the resource-controlling systems may be caused to allocate corresponding resources and perform the one or more processes in accordance with the protocol.

In yet another aspect, one or more non-transitory, machine-readable media are disclosed as having machine-readable instructions thereon which, when executed by one or more processing devices, cause the one or more processing devices to perform one or a combination of the following operations. Electronic communications, received via one or more interfaces, from resource-controlling systems and/or monitoring devices may be monitored to identify signals. The signals may correspond to processes performed by the resource-controlling systems, resource capacities of resources controlled by the resource-controlling systems, and/or states of the resource-controlling systems. One or more system interactions that correspond to a defined event may be detected. The defined event may correspond to a device interaction or data change caused with respect to at least one remote system, at least one endpoint device, and/or at least one agent device. A protocol that includes parameter constraints mapped to the defined event may be identified. One or more operating conditions of one or more of the resource-controlling systems and/or one or more metrics of one or more processes performed by one or more of the resource-controlling systems may be determined based at least in part on the monitoring. A subset of the resource-controlling systems may be identified at least partially as a function of the one or more operating conditions and/or the one or more metrics. At least one resource-controlling system of the subset of the resource-controlling systems may be caused to allocate corresponding resources and perform the one or more processes in accordance with the protocol.

In various embodiments, the causing the at least one resource-controlling to allocate corresponding resources and perform the one or more processes in accordance with the protocol may include transmitting instructions to at least one resource-controlling system of the subset of the resource-controlling systems. In various embodiments, an implementation of the protocol may be generated, the implementation of the protocol defining an operational composite. In various embodiments, the instructions may cause the at least one resource-controlling system to allocate corresponding resources and perform the one or more processes in accordance with the operational composite. In various embodiments, a pattern of performance metrics mapped to the resource-controlling systems may be learned based at least in part on the monitoring. The identifying the subset of the resource-controlling systems may be based at least in part on the pattern of performance metrics. In various embodiments, a plurality of data items may be aggregated at least in part by: for each electronic communication, processing the electronic communication to identify one or more digital identifiers uniquely mapped to one or more of the resource-controlling systems; and extracting and caching a data portion from the electronic communication; and consolidating the data portions and mapping the consolidated data portions to one or more resource-controlling system profile records that are stored in one or more data storages. In various embodiments, at least one of the one or more resource-controlling system profile records may be used to model the at least one resource-controlling system. The modeling may include determining one or more individual performance metrics mapped to the at least one resource-controlling system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
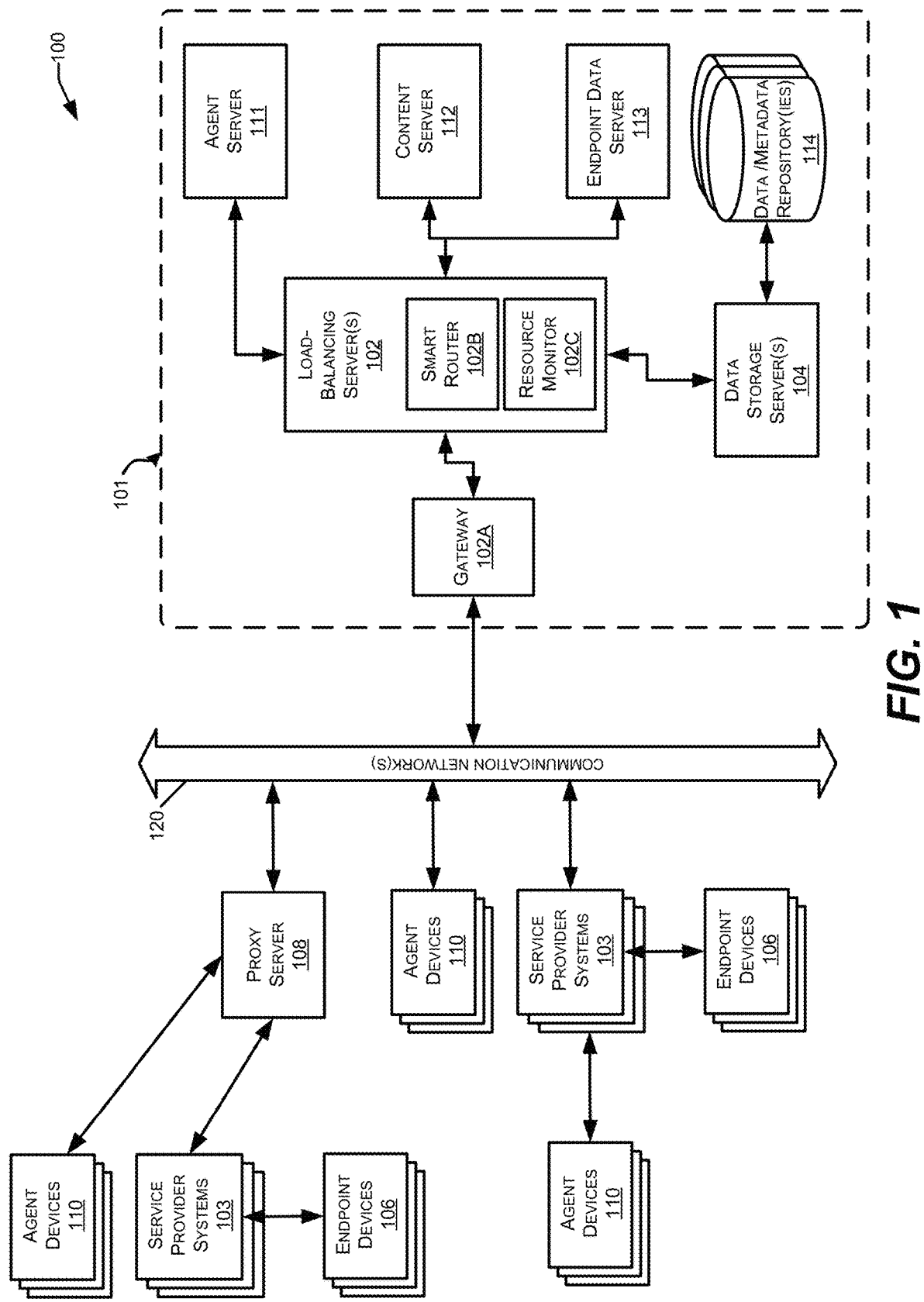
FIG. 1 illustrates a block diagram of various components of an example network which implements and supports various embodiments to facilitate adaptive and cooperative multi-system operations in conformance with smart routing protocols, in accordance with disclosed embodiments according to the present disclosure.

With reference now to FIG. 1, a block diagram is shown illustrating various components of an example network 100 which implements and supports various embodiments to facilitate adaptive and cooperative multi-system operations in conformance with smart routing protocols. As disclosed further herein, the facilitating of the adaptive and cooperative multisystem operations may include real-time load balancing and resource balancing. The network 100 may allow for controlling resource access and operations across a plurality of systems and devices. The network 100 includes a plurality of computing systems and endpoint computing devices corresponding to multiple geographic and/or virtual locations, regions, and/or domains, for instance, different geographic areas within different jurisdictions, different data centers, different networks, different computing infrastructures, etc. Various embodiments may include many such systems and endpoint devices. Each of the multiple systems may, for example, be configured to perform a different type of operation, to use different resources and/or different types of resources, to generate different types of outputs, to be located at different geographical locations, to correspond to (e.g., to grant access to) different agents or users, and so on. For brevity, the network 100 is depicted in a simplified and conceptual form, and may generally include more or fewer systems, devices, networks, and/or other components as desired. The network 100 may include several physical components and/or several virtual components such as, for example, one or several cloud computing components. In general, the network 100 may include one or more communication networks 120 that can be used for bi-directional communication paths for data transfer between components of network 100. The communication networks 120 may include any number of different types of networks enabling communication between the various computing devices, servers, and other components of the network 100, such as, for example, computer networks, telecommunications networks, wireless networks, and/or any combination of these and/or other networks.

The network 100 may further include one or more systems 101 to facilitate adaptive and cooperative multi-system operations in conformance with smart routing protocols. Among other things, the network 100 may include one or more remote provider systems 103, one or more endpoint devices 106, and/or the one or more agent devices 110, each of which may be communicatively couplable with the system 101 via the communication networks 120. The one or more provider systems 103 (also referenced herein as remote systems 103) may be, include, or otherwise correspond to one or more resource-controlling systems. In some embodiments, one or more agent devices 110 may also be, include, or otherwise correspond to one or more resource-controlling systems. As disclosed further herein, the system 101 may monitor, process data from, control, command, instruct, re-configure, and/or cause performance of operations by each of the one or more systems 103 and/or one or more agent devices 110 facilitate adaptive and cooperative multi-system operations in conformance with smart routing protocols.

The system 101 may include one or more system coordination servers 102 (also referenced herein as load-balancing servers 102). The system load-balancing servers 102 may include any suitable type of server including, for example, a rack server, a tower server, a miniature server, a blade server, a mini rack server, a mobile server, an ultradense server, a super server, or the like, and may include various hardware components, for example, a motherboard, processing units, memory systems, hard drives, network interfaces, power supplies, etc. System load-balancing servers 102 may include one or more server farms, clusters, or any other appropriate arrangement and/or combination of computer servers. System load-balancing servers 102 may operate according to stored instructions located in a memory subsystem of the servers 102, and may run an operating system, including any suitable server operating system and/or any other operating systems discussed herein. In some embodiments, the remote systems 103 may include some of the same or similar physical and logical components as the system 101.

In some embodiments, one of the elements of the system 101 may be a gateway 102A that communicates with other elements of the network 100 through a secure connection using a communication module over the network(s) 120. The gateway 102A may include a hardware and/or virtual software appliance installed at the system 101 and, in various embodiments, may correspond to the one or more load-balancing servers 102, may be integrated with the one or more load-balancing servers 102, or may be separate from but communicatively coupled to the one or more load-balancing servers 102. The gateway 102A may be configured to operate as a control point for the interface between the system 101 and the other components of the network 100 while providing access security, data security, auditing and monitoring capabilities, and/or integration with external systems that are remotely located away from the system 101. In some embodiments, the gateway 102A may include or correspond to API gateway configured to provide a service for provisioning and monitoring APIs (e.g., REST, HTTP, WebSocket, and/or the like APIs). The system 101 may be extended provide a multi-region deployment, with multiple instances of the components illustrated being configured for particular geographical regions. Thus, for example, multiple gateways 102A, servers, databases/repositories, and/or the like may be deployed and configured to provide services to multiple regions.

The system 101 may include a smart router 102B. In some embodiments, the smart router 102B may be gateway 102A. In various embodiments, the smart router 102B may be separate from or integrated with or included in the gateway 102A and/or the one or more load-balancing servers 102. In some embodiments, the one or more load-balancing servers 102 may be configured to provide the smart router 102B. In some embodiments, the smart router 102B may include or otherwise correspond to a resource monitor. In various embodiments, a resource monitor may be separate from the gateway 102A. For example, the smart router 102A may include the resource monitor some embodiments. In other embodiments, the resource monitor may be separate from, but communicatively coupled to, the smart router 102A and/or the load-balancing servers 102.

The system 101 may include one or more data storage servers 104, which may include file-based storage systems, block storage systems, and/or cloud object storage systems. Data storages 104 may comprise stored data germane to the functions of the network 100. Illustrative examples of data storages 104 that may be maintained in certain embodiments of the network 100 are described below. In some embodiments, multiple data storages may reside on a single server 104, either using the same storage components of server 104 or using different physical storage components to assure data security and integrity between data storages. In other embodiments, each data storage may have a separate dedicated data storage server 104.

The data storage servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the data storage server 104, and particularly, the tier 0 storage is the fastest storage that is not RAM or cache memory. In some embodiments, the tier 0 memory can be embodied in solid state memory such as, for example, a solid-state drive (SSD) and/or flash memory. In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any correct level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives. In some embodiments, the one or several hardware and/or software components of the data storage server 104 can be arranged into one or several storage area networks (SAN), which one or several storage area networks can be one or several dedicated networks that provide access to data storage, and particularly that provides access to combined (eliminating data not useful), block level data storage. A SAN typically has its own network of storage devices that are generally not accessible through the local area network (LAN) by other devices. The SAN allows access to these devices in a manner such that these devices appear to be locally attached to the endpoint device.

The endpoint devices 106 and agent devices 110 may display content received via the network 100 and may support various types of endpoint interactions with the content. The endpoint devices 106 and agent devices 110 may include mobile devices such as smartphones, tablet computers, digital assistants, wearable computing devices, bodily implanted communication devices, vehicle-based devices, and/or the like. Such mobile devices may run a variety of mobile operating systems and may be enabled for Internet, e-mail, short message service (SMS), Bluetooth®, mobile radio-frequency identification (M-RFID), near-field communication (NFC), and/or other communication protocols. Within a network 100, mobile devices 106 may be configured to support mobile resource value transfer authorization and transfer functionalities. In some cases, mobile devices 106 may execute a mobile application to store user data and support secure data and/or value transfers via various different techniques, for example, SMS-based transactional value transfers, Web Application Protocol mobile value transfers, and NFC-based value transfers. Other endpoint devices 106 and agent devices 110 may be special-purpose computing devices including, by way of example, personal computers, laptop computers, workstation computers, projection devices, and interactive room display systems. Additionally, endpoint devices 106 and agent devices 110 may be any other electronic devices, such as a thin-client computers, an Internet-enabled gaming systems, business or home appliances, and/or personal messaging devices, capable of communicating over network(s) 120. In some embodiments, one or more endpoint devices 106 and/or agent devices 110 may include digital kiosk devices such as point-of-sale (POS) terminals, resource transfer terminals, and/or the like.

In different contexts of networks 100, the endpoint devices 106 and agent devices 110 may correspond to different types of specialized devices. In some embodiments, the endpoint devices 106 and agent devices 110 may operate in the same physical location 107. In such cases, the devices may contain components that support direct communications with other nearby devices, such as wireless transceivers and wireless communications interfaces, Ethernet sockets or other Local Area Network (LAN) interfaces, etc. In other implementations, the endpoint devices 106 and agent devices 110 need not be used at the same location 107, but may be used in remote geographic locations in which each endpoint device 106 and agent device 110 may use security features and/or specialized hardware (e.g., hardware-accelerated SSL and HTTPS, WS-Security, firewalls, etc.) to communicate with the system load-balancing server 102 and/or other remotely located endpoint devices 106. Additionally, different endpoint devices 106 and agent devices 110 may be assigned different designated particularized sets of access permissions and, in such cases, the different devices may be provided with additional hardware and/or software components to provide content and support endpoint capabilities not available to the other devices.

The network 100 also may include one or more proxy servers 108 configured to operate between the system 101 and one or more endpoint devices 106, agent devices 110, and/or systems 103. The proxy server 108 may be configured to maintain private endpoint data at the proxy server 108 while using applications or functionalities hosted on other servers and systems of the network 100. For example, the proxy server 108 may be used to maintain private data of an endpoint within one jurisdiction even though the endpoint is accessing an application hosted on a server (e.g., a remote system 103) located outside the jurisdiction. In such cases, the proxy server 108 may intercept communications between an endpoint device 106 or agent device 110 and other devices that include private endpoint data. The proxy server 108 may create a token or identifier that does not disclose the private data and may use the token or identifier when communicating with the other servers and systems, instead of using the endpoint's private data.

As illustrated in FIG. 1, the system load-balancing server 102 may be in communication with one or more additional servers, such as a content server system 112, an endpoint data server 113, and/or an agent server 111. Each of these servers may include some or all of the same physical and logical components as the system load-balancing server(s) 102, and in some cases, the hardware and software components of these servers may be incorporated into the system load-balancing server(s) 102, rather than being implemented as separate computer servers.

Content server system 101 may include hardware and software components to generate, store, and maintain the content resources for distribution to endpoint devices 106 and other devices in the network 100. Content server system 101 may include data storages of materials, various interface elements, page specifications, field specifications, and corresponding metadata specifications disclosed herein to provide content specifications for systems 103 and/or agent devices 110 to facilitate painting of screens of endpoint devices 106.

Endpoint data server 113 may include hardware and software components that store and process data for multiple particularized access instances relating to particularized endpoint accesses of the network 100. For example, the system load-balancing server 102 may record and track each endpoint's system usage, including their endpoint device 106, etc. This data may be stored and processed by the endpoint data server 113, to support compliance documentation features disclosed herein.

The load-balancing server 102 may include hardware and software components to initiate various administrative functions at the system 101 and other components within the network 100. For example, the load-balancing server 102 may monitor device status and performance for the various servers, data storages, and/or endpoint devices 106 in the network 100. When necessary, the load-balancing server 102 may add or remove devices from the network 100 and perform device maintenance such as providing software updates to the devices in the network 100. Various administrative tools on the load-balancing server 102 may allow authorized endpoints to set endpoint access permissions to various content resources, monitor resource usage by endpoints and devices 106, systems 103, and/or agent devices 110 and perform analyses and generate reports on specific endpoints and devices 106, systems 103, and/or agent devices 110.

Figure 2:
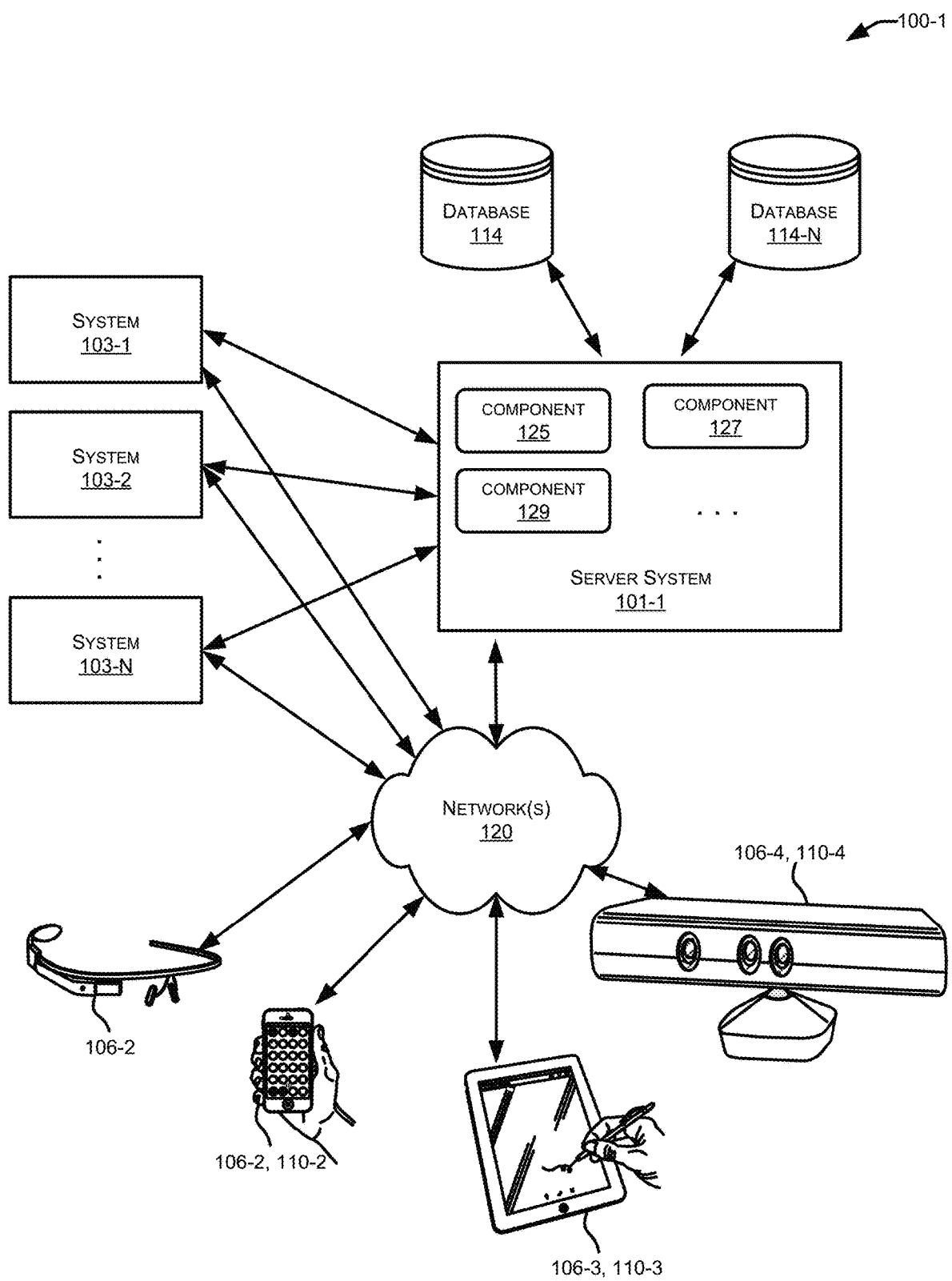
FIG. 2 depicts a simplified diagram of a network for implementing disclosed embodiments in accordance with present disclosure.

FIG. 2 depicts a simplified diagram of a network 100 for implementing disclosed embodiments in accordance with present disclosure. The selection and/or arrangement of components depicted in FIG. 2 are shown only by way of example and are not meant to be limiting. In the illustrated embodiment, network 100 includes one or more endpoint and/or agent computing devices 106 and/or 110, which are configured to execute and operate a client application such as a web browser, client, or the like over one or more network(s) 120. Server system 101 may be communicatively coupled with remote endpoint and/or agent computing devices 106 and/or 110 via network 120, as well as any number of remote systems 103 that may have at least some components that are the same as or are similar to those of the system 101 disclosed herein.

In various embodiments, server system 101 may be adapted to run one or more services or software applications provided by one or more of the components of the system. In some embodiments, these services may be offered as web-based or cloud services or under a Software as a Service (SaaS) model to the systems 103 and/or endpoint and/or agent computing devices 106 and/or 110. Users operating endpoint and/or agent computing devices 106 and/or 110 may in turn utilize one or more client applications to interact with the systems 103 and/or server system 101 to utilize the services provided by these components.

In the configuration depicted in the figure, the software components 125, 127 and 129 of system 100 are shown as being implemented on server system 101. In other embodiments, one or more of the components of system 100 and/or the services provided by these components may also be implemented by one or more of the systems 103 and/or the endpoint and/or agent computing devices 106 and/or 110. Users operating the systems 103 and/or the endpoint and/or agent computing devices may then utilize one or more client applications to use the services provided by these components. These components may be implemented in hardware, firmware, software, or combinations thereof. It should be appreciated that various different system configurations are possible, which may be different from network 100. The embodiment shown in the figure is thus one example of a network for implementing an embodiment system and is not intended to be limiting.

Databases 114 may reside in a variety of locations. By way of example, one or more of databases 114 may reside on a non-transitory storage medium local to (and/or resident in) server system 101. Alternatively, databases 114 may be remote from server system 101 and in communication with server system 101 via a network-based or dedicated connection. In one set of embodiments, databases 114 may reside in a storage-area network (SAN). Similarly, any necessary files for performing the functions attributed to server system 101 may be stored locally on server system 101 and/or remotely, as appropriate. In one set of embodiments, databases 114 may include relational databases, such as databases provided by AWS, that are adapted to store, update, and retrieve data in response to SQL-formatted commands.

Endpoint and/or agent computing devices 106 and/or 110 may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The endpoint and/or agent computing devices can be general purpose personal computers including, by way of example, personal computers and/or laptop computers running various versions of Microsoft Windows®, Apple Macintosh®, and/or Linux operating systems. The endpoint and/or agent computing devices can be workstation computers running any of a variety of commercially-available UNIX® or UNIX-like operating systems, including without limitation the variety of GNU/Linux operating systems, such as for example, Google Chrome OS. Alternatively, or in addition, endpoint and/or agent computing devices 106 and/or 110 may be any other electronic device, such as a thin-client computer, an Internet-enabled gaming system (e.g., a Microsoft Xbox gaming console with or without a Kinect® gesture input device), and/or a personal messaging device, capable of communicating over network(s) 120. Although exemplary network 100 is shown with four endpoint and/or agent computing devices, any number of endpoint and/or agent computing devices may be supported. Other devices, such as devices with sensors, etc., may interact with the systems 103 and/or server system 101.

In certain instances, the system 101 and/or a system 103 may include a resource monitor 102C, which may be one or more monitoring devices, a computer system and/or a server system including or coupled to a monitoring device in various instances, to track resource states and/or attributes. The resource states and/or attributes may include, for example, resource identifiers, resource specifications, resource functions, resource generation, availability assessment, storage, staging, allocation, and/or the like of one or more resources. In various instances, the resource monitor 102C may or may not be located within a system 103 and/or may correspond to the resource monitor 102C of the system 101, and may be included in and/or integrated with the load-balancing servers 102. In various instances, the resource monitor 102C may be separate from, but communicatively coupled with, the load-balancing servers 102. In some instances, the resource monitor 102C may be included in and/or integrated with the gateway 102A. In some instances, the resource monitor 102C may be configured to receive input (e.g., from an authorized user), which may indicate resource states and/or attributes. In some instances, the resource monitor 102C may be (e.g., via a wireless or wired connection) connected to one or more devices for resource identification, resource specification, resource functions, resource generation, availability assessment, storage, staging, allocation, and/or the like of one or more resources and/or one or more sensors. Such connections may enable monitoring device to estimate a resource state. In various embodiments, a resource state may include, describe, specify, indicate, define, and/or otherwise correspond to one or a combination of a capacity, a metric, a value, an amount, a utilization, an operational condition, a speed, a bandwidth, a fault, a shortage, a surplus, and/or the like with respect to a resource and/or a set of resources. In various embodiments, a defined event may correspond to a device interaction or data change caused with respect to at least one remote system (e.g., 103), at least one endpoint device 106, and/or at least one agent device 110 that may include, specify, indicate, define, and/or otherwise correspond to one or more factors affecting resource states and/or operations with respect to the resources, allocations and reallocations of resources, assignments and reassignments of resources, transfers of resources, deliveries of resources, and/or the like.

A resource monitor 102C may manage and update a resource data storage. In various instances, a resource data storage may be included in a system 103 and/or the system 101 (e.g., in a repository 114). The system 101 may pull or otherwise receive resource data from the resource monitor 102C and/or the resource data store for each resource-controlling system for transformation and storage in the data stores 114 for use in making resource assessments, generating resource alerts and reports, querying resource data, making resource assignment adjustments, and/or the like. The resource data storage may include resource data for resources, resource-controlling systems, entities (e.g., clients), and/or the like. The resource data may include resource description data, which may include resource identifiers, resource specifications, resource functions, and/or the like. The resource description data may further include historical, current, and/or projected resource states and/or attributes such as resource identifiers, resource specifications, resource functions, resource allocation, availability assessment, storage, staging, and/or the like of one or more resources. The resource data storage may or may not be part of a resource-controlling system 103. In some instances, the resource data storage may be remote from monitoring device and/or resource-controlling system 103 to which it pertains. In some instances, the resource data storage may be in the cloud.

A resource-controlling system 103 may include one or more controlling devices that can manage and update a resource timetable for one or more resources. The system 101 may pull or otherwise receive timetable information from the one or more controlling devices and/or a resource timetable data store for each resource-controlling system for transformation and storage in the data stores 114 for use in making resource assessments, generating resource alerts and reports, querying resource data, making resource assignment adjustments, and/or the like. The resource timetable may include a schedule that indicates that particular times and/or time periods that have been assigned to particular resources for particular transfers for historical, current, and/or projected resource states and/or attributes such as resource identifiers, resource specifications, resource functions, resource allocation, availability assessment, storage, staging, and/or the like of one or more resources. Assigned times/periods may include or may be associated with one or more buffer time periods, such as a buffer time period to prepare and/or provide certain resources. The controlling device may be configured to locally detect user input or to receive communications that identify user input, where the user input may identify a parameter for the resource timetable and/or a request. Generating an assignment may include updating the resource timetable data store so as to reflect the assignment and/or change timetable information.

Network(s) 120 in network 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 120 can be a local area network (LAN), such as one based on Ethernet, Token-Ring and/or the like. Network(s) 120 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

The systems 103 and/or server system 101 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server system 101 may be adapted to run one or more services or software applications described in the foregoing disclosure. For example, server system 101 may correspond to a server for performing processing described herein according to an embodiment of the present disclosure.

The systems 103 and/or server system 101 may run an operating system including any of those discussed above, as well as any available server operating system. The systems 103 and/or server system 101 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

In some implementations, server system 101 may include one or more applications to analyze and consolidate data feeds and/or event updates received from the systems 103 and/or users of endpoint and/or agent computing devices 106 and/or 110, as well as other data sources. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The data sources may be sources of resource description data, such as resource states, resource attributes, resource forecasts, and/or the like. Furthermore, in various embodiments, the one or more data sources may include one or more of a database, a website, any repository of data in any suitable form, a third-party system, monitoring systems local to a site that detect data indicative of events and/or components thereof. By way of example, the one or more data sources may be sources of event data indicative of environmental and/or civil events such as current, real-time, forecast, and/or historical information for one or more regions including and/or proximate to one or more sites relating to news (e.g., about geo-political unrest, a resource-controlling system and/or an entity associated therewith); regulatory action of a jurisdiction (e.g., government actions affecting a resource-controlling system in a particular country; and/or the like. Server system 101 may also include one or more applications to display the data feeds and/or real-time events via one or more display devices of the systems 103 and/or endpoint and/or agent computing devices 106 and/or 110.

Figure 3:
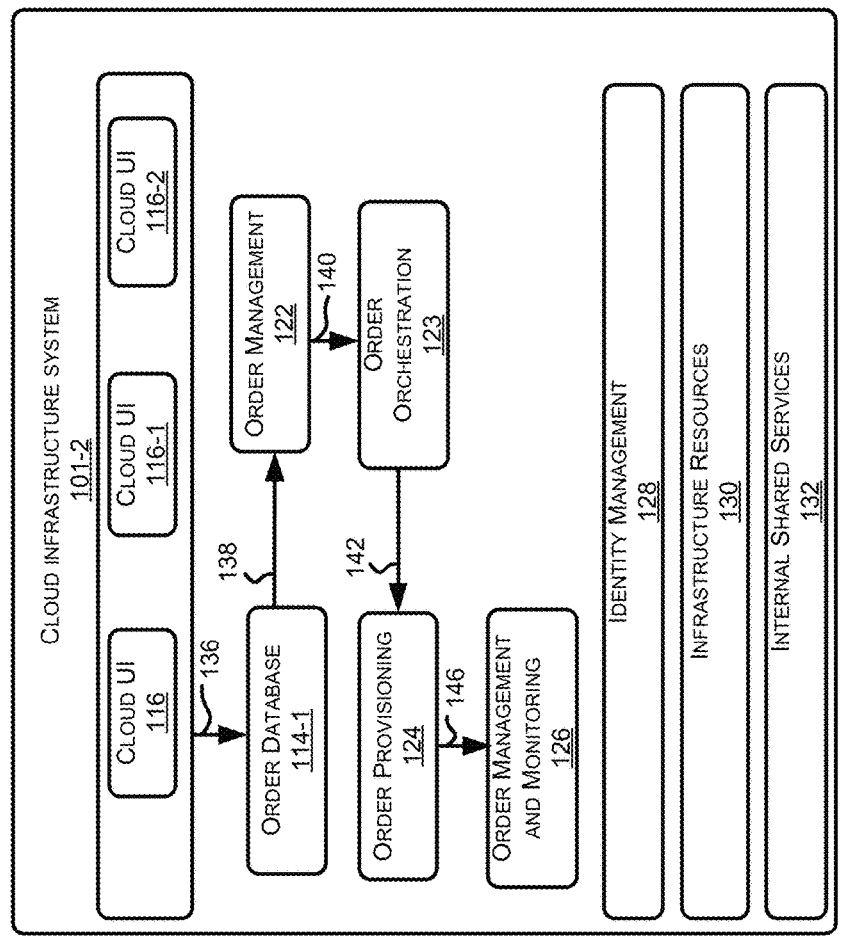
FIG. 3 is a simplified block diagram of one or more components of a system environment by which services provided by one or more components of the system may be provided as cloud services, in accordance with embodiments according to the present disclosure.
Figure 3:
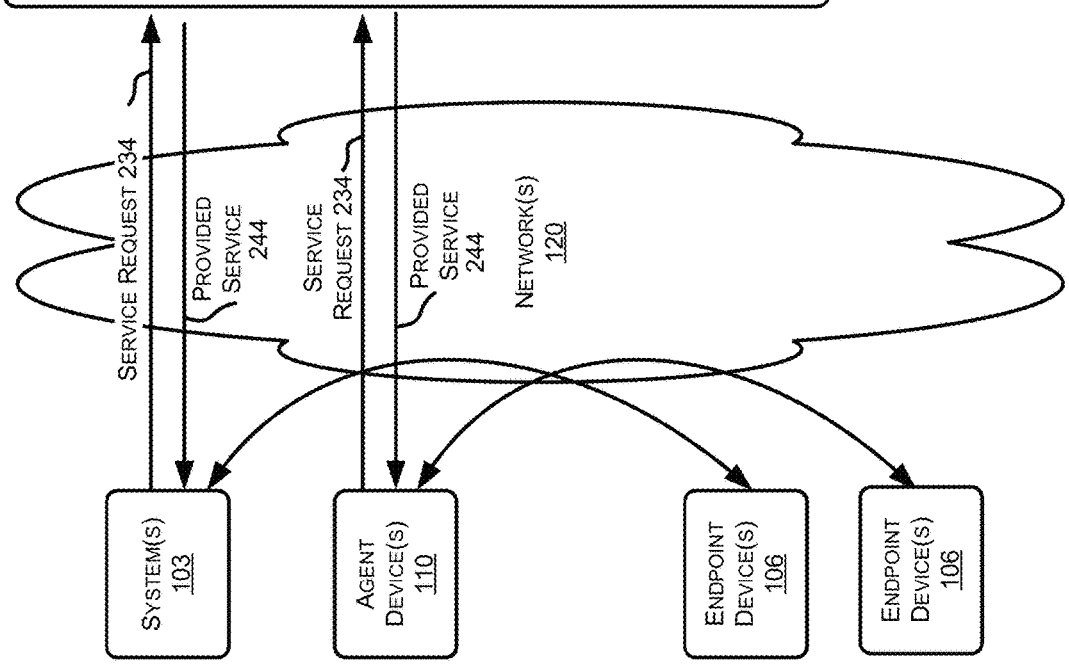

FIG. 3 is a simplified block diagram of one or more components of a system environment by which services provided by one or more components of the system 101 may be offered as cloud services, in accordance with certain embodiments of the present disclosure. In the illustrated embodiment, the system environment includes one or more service provider systems 103 and/or agent devices 110 that interact with the cloud infrastructure system 101 that provides cloud services. The endpoint devices 106 may interact with the service provider systems 103 and/or agent devices 110. The systems 103, agent devices 110, and/or endpoint devices 106 may be configured to operate a client application such as a web browser, or some other application, which may be used by a user of the client computing device to interact with cloud infrastructure system 101 to use services provided by system 101. It should be appreciated that the cloud infrastructure system 101 depicted in the figure may have other components than those depicted. Further, the embodiment shown in the figure is only one example of a cloud infrastructure system that may incorporate an embodiment of the invention. In some other embodiments, the cloud infrastructure system 101 may have more or fewer components than shown in the figure, may combine two or more components, or may have a different configuration or arrangement of components.

In certain embodiments, services provided by the cloud infrastructure system 101 may include a host of services that are made available to systems 103, endpoint devices 106, and/or agent devices 110, such as the dynamic services disclosed herein. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the client's own on-premises servers and systems. For example, a cloud service provider's system may host an application, and a user may, via a communication network such as the Internet, on demand, order and use the application. In certain embodiments, the system 101 may include a suite of applications, middleware, and database service offerings that are delivered to a client in a self-service, elastically scalable, reliable, highly available, and secure manner.

The system 101 may provide the cloud services via different deployment models. For example, services may be provided under a public cloud model in which the services are made available to the general public or different industry enterprises. As another example, services may be provided under a private cloud model in which the system 101 is operated solely for a single entity or set of entities. The cloud services may also be provided under a community cloud model in which the system 101 and the services provided by the system 101 are shared by several entities in a related community. The cloud services may also be provided under a hybrid cloud model, which is a combination of two or more different models.

In some embodiments, the services provided by the system 101 may include one or more services provided under Software as a Service (SaaS) category, Platform as a Service (PaaS) category, Infrastructure as a Service (IaaS) category, or other categories of services including hybrid services. A client may order one or more services provided by the system 101. The system 101 then performs processing to provide the services in the client's order.

In some embodiments, the services provided by the 101 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Clients can acquire the application services without the need for clients to purchase separate licenses and support. Various different SaaS services may be provided.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. By utilizing the services provided by the PaaS platform, clients can employ programming languages and tools supported by the cloud infrastructure system and control the deployed services. In some embodiments, platform services provided by the cloud infrastructure system may include database cloud services, middleware cloud services, and Java cloud services. Middleware cloud services may provide a platform for clients to develop and deploy various business applications, and Java cloud services may provide a platform for clients to deploy Java applications, in the cloud infrastructure system. Various different infrastructure services may be provided by an IaaS platform in the cloud infrastructure system. The infrastructure services facilitate the management and control of the underlying computing resources, such as storage, networks, and other fundamental computing resources for clients utilizing services provided by the SaaS platform and the PaaS platform.

In certain embodiments, the system 101 may also include infrastructure resources 130 for providing the resources used to provide dynamic services to clients of the cloud infrastructure system. In some embodiments, infrastructure resources 130 may include pre-integrated and optimized combinations of hardware, such as servers, storage, and networking resources to execute the dynamic services. In certain embodiments, a number of internal shared services 132 may be provided that are shared by different components or modules of cloud infrastructure system 101 and by the services provided by the system 101. These internal shared services may include, without limitation, a security and identity service, an integration service, a repository service, an enterprise manager service, a virus scanning and whitelist service, a high availability, backup and recovery service, service for enabling cloud support, an email service, a notification service, a file transfer service, and the like. In certain embodiments, the system 101 may provide comprehensive management of cloud services (e.g., SaaS, PaaS, and IaaS services) in the cloud infrastructure system.

In certain embodiments, as depicted in the figure, cloud management functionality may be provided by one or more modules, such as an order management module 122, an order orchestration module 123, an order provisioning module 124, an order management and monitoring module 126, and an identity management module 128. These modules may include or be provided using one or more computers and/or servers, which may be general purpose computers, specialized server computers, server farms, server clusters, or any other appropriate arrangement and/or combination.

In one example operation 234, a client using a client device, such as systems 103 and/or agent devices 110, may interact with the system 101 by requesting one or more services provided by the system 101. In certain embodiments, the client may access a cloud User Interface (UI) 116 and place an order via such the UI. The order information received by the system 101 in response to the client placing an order may include information identifying the client and one or more services offered by the system 101. After an order has been placed by the client, the order information is received via the cloud UIs 116. At operation 136, the order is stored in order database 118. Order database 118 can be one of several databases operated by the system 101 and operated in conjunction with other system elements. At operation 138, the order information is forwarded to an order management module 122. In some instances, order management module 122 may be configured to perform verification and timing functions related to the order, such as verifying the order, and upon verification, booking the order. At operation 140, information regarding the order is communicated to an order orchestration module 123. Order orchestration module 123 may utilize the order information to orchestrate the provisioning of services and resources for the order placed by the client. In some instances, order orchestration module 123 may orchestrate the provisioning of resources to support the subscribed services using the services of order provisioning module 124.

In certain embodiments, order orchestration module 123 enables the management of processes associated with each order and applies business logic to determine whether an order should proceed to provisioning. At operation 142, upon receiving an order for a new subscription, order orchestration module 123 sends a request to order provisioning module 124 to allocate resources and configure those resources needed to fulfill the subscription order. Order provisioning module 124 enables the allocation of resources for the services ordered by the client. Order provisioning module 124 provides a level of abstraction between the cloud services provided by the system 101 and the physical implementation layer that is used to provision the resources for providing the requested services. Order orchestration module 123 may thus be isolated from implementation details, such as whether or not services and resources are actually provisioned on the fly or pre-provisioned and only allocated/assigned upon request.

At operation 144, once the services and resources are provisioned, a notification of the provided service may be sent to clients on systems 103 and/or agent devices 110 by order provisioning module 124 of the system 101. At operation 146, the client's subscription order may be managed and tracked by an order management and monitoring module 126. In some instances, order management and monitoring module 126 may be configured to collect usage statistics for the services in the subscription order, such as the amount of storage used, the amount data transferred, the number of users, and the amount of system up time and system down time.

In certain embodiments, the system 101 may include an identity management module 128. Identity management module 128 may be configured to provide identity services, such as access management and authorization services in the system 101. In some embodiments, identity management module 128 may control information about clients who wish to utilize the services provided by the system 101. Such information can include information that authenticates the identities of such clients and information that describes which actions those clients are authorized to perform relative to various system resources (e.g., files, directories, applications, communication ports, memory segments, etc.). Identity management module 128 may also include the management of descriptive information about each client and about how and by whom that descriptive information can be accessed and modified.

Figure 4:
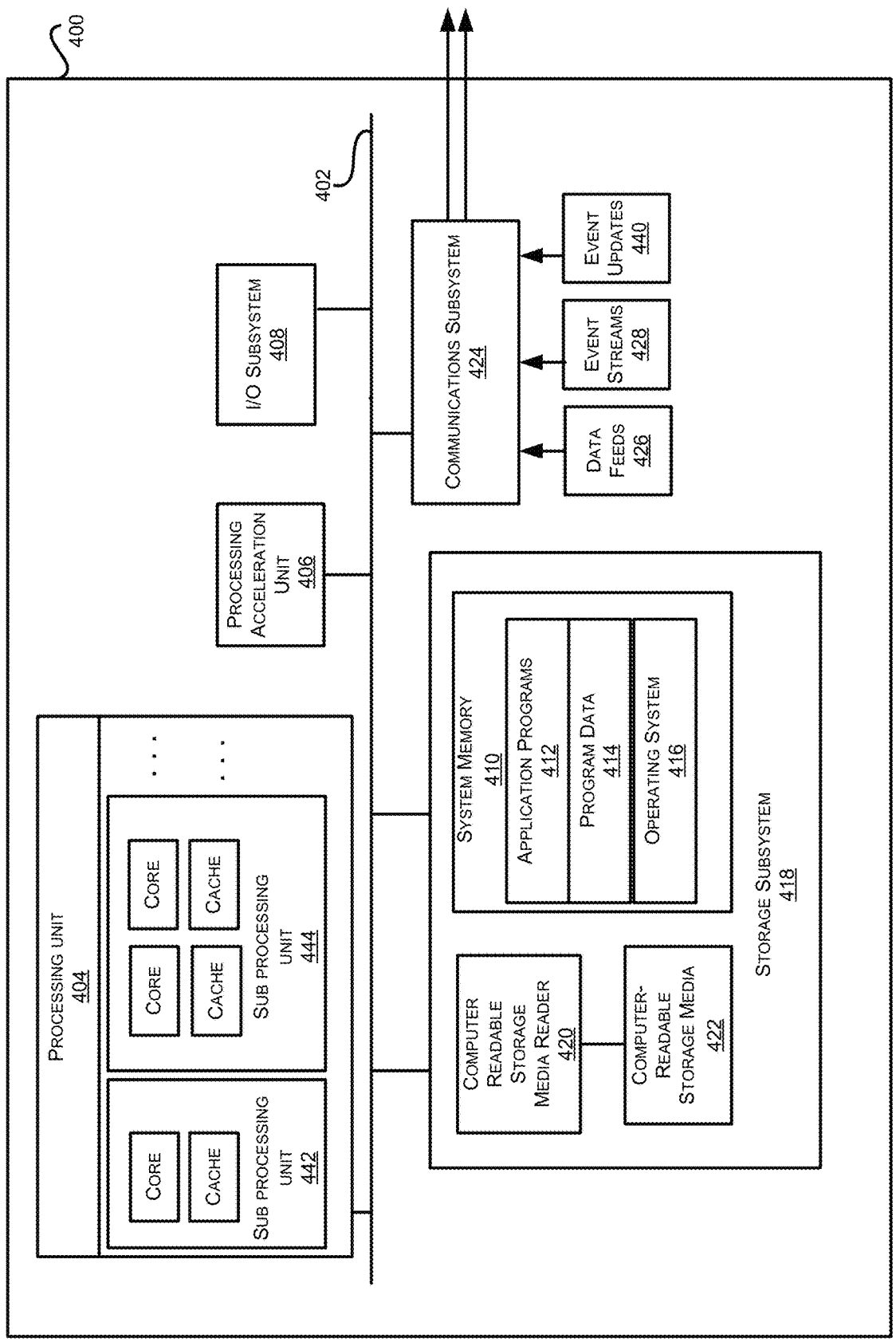
FIG. 4 illustrates an exemplary computer system, in which various embodiments according to the present disclosure may be implemented.

FIG. 4 illustrates an exemplary computer system 400, in which various embodiments according to the present disclosure may be implemented. The system 400 may be used to implement any of the computer systems (e.g., system 101, systems 103, servers 108, agent devices 110, and/or endpoint devices 106) described herein. As shown in the figure, computer system 400 includes a processing unit 404 that communicates with a number of peripheral subsystems via a bus subsystem 402. These peripheral subsystems may include a processing acceleration unit 406, an I/O subsystem 408, a storage subsystem 418 and a communications subsystem 424. Storage subsystem 418 includes tangible computer-readable storage media 422 and a system memory 410.

Bus subsystem 402 provides a mechanism for letting the various components and subsystems of computer system 400 communicate with each other as intended. Although bus subsystem 402 is shown schematically as a single bus, alternative embodiments of the bus subsystem may utilize multiple buses. Bus subsystem 402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which can be implemented as one or more integrated circuits (e.g., a conventional microprocessor or microcontroller), controls the operation of computer system 400. One or more processors may be included in processing unit 404. These processors may include single core or multicore processors. In certain embodiments, processing unit 404 may be implemented as one or more independent processing units 432 and/or 434 with single or multicore processors included in each processing unit. In other embodiments, processing unit 404 may also be implemented as a quad-core processing unit formed by integrating two dual-core processors into a single chip.

In various embodiments, processing unit 404 can execute a variety of programs in response to program code and can maintain multiple concurrently executing programs or processes. At any given time, some or all of the program code to be executed can be resident in processor(s) 404 and/or in storage subsystem 418. Through suitable programming, processor(s) 404 can provide various functionalities described above. Computer system 400 may additionally include a processing acceleration unit 406, which can include a digital signal processor (DSP), a special-purpose processor, and/or the like. In some embodiments, the processing acceleration unit 406 may include or work in conjunction with an acceleration engine such as that disclosed herein to improve computer system functioning.

I/O subsystem 408 may include user interface input devices and user interface output devices. User interface input devices may include a keyboard, pointing devices such as a mouse or trackball, a touchpad or touch screen incorporated into a display, a scroll wheel, a click wheel, a dial, a button, a database, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 400 may comprise a storage subsystem 418 that comprises software elements, shown as being currently located within a system memory 410. System memory 410 may store program instructions that are loadable and executable on processing unit 404, as well as data generated during the execution of these programs. Depending on the configuration and type of computer system 400, system memory 410 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 404. In some implementations, system memory 410 may include multiple different types of memory, such as static random-access memory (SRAM) or dynamic random-access memory (DRAM). In some implementations, a basic input/output system (BIOS), containing the basic routines that help to transfer information between elements within computer system 400, such as during start-up, may typically be stored in the ROM. By way of example, and not limitation, system memory 410 also illustrates application programs 412, which may include client applications, Web browsers, mid-tier applications, relational database management systems (RDBMS), etc., program data 414, and an operating system 416. By way of example, operating system 416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 418 may also provide a tangible computer-readable storage medium for storing the basic programming and data constructs that provide the functionality of some embodiments. Software (programs, code modules, instructions) that when executed by a processor provide the functionality described above may be stored in storage subsystem 418. These software modules or instructions may be executed by processing unit 404. Storage subsystem 418 may also provide a repository for storing data used in accordance with the present invention.

Storage subsystem 400 may also include a computer-readable storage media reader 420 that can further be connected to computer-readable storage media 422. Together and, optionally, in combination with system memory 410, computer-readable storage media 422 may comprehensively represent remote, local, fixed, and/or removable storage devices plus storage media for temporarily and/or more permanently containing, storing, transmitting, and retrieving computer-readable information.

Computer-readable storage media 422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 400.

By way of example, computer-readable storage media 422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 422 may include, but is not limited to, Zip® drives, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 424 provides an interface to other computer systems and networks. Communications subsystem 424 serves as an interface for receiving data from and transmitting data to other systems from computer system 400. For example, communications subsystem 424 may enable computer system 400 to connect to one or more devices via the Internet. In some embodiments communications subsystem 424 can include radio frequency (RF) transceiver components for accessing wireless voice and/or data networks (e.g., using cellular telephone technology, advanced data network technology, such as 5G, 4G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 424 can provide wired network connectivity (e.g., Ethernet) in addition to or instead of a wireless interface.

In some embodiments, communications subsystem 424 may also receive input communication in the form of structured and/or unstructured data feeds 426, event streams 428, event updates 430, and the like on behalf of one or more users who may use computer system 400. By way of example, communications subsystem 424 may be configured to receive data feeds 426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 424 may also be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 424 may also be configured to output the structured and/or unstructured data feeds 426, event streams 428, event updates 430, and the like to one or more databases that may be in communication with one or more streaming data source computers coupled to computer system 400.

Computer system 400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Various methods described herein may be implemented by a computer system, such as computer system 400. Each step of these methods may be executed automatically by the computer system 400. In various embodiments, some steps may be provided with inputs/outputs involving a user. For example, a user may provide inputs for each step in a method, and each of these inputs may be in response to a specific output requesting such an input, wherein the output is generated by the computer system 400. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. Furthermore, some embodiments of each of the methods described herein may be implemented as a set of instructions stored on a tangible, non-transitory storage medium to form a tangible software product.

Figure 5:
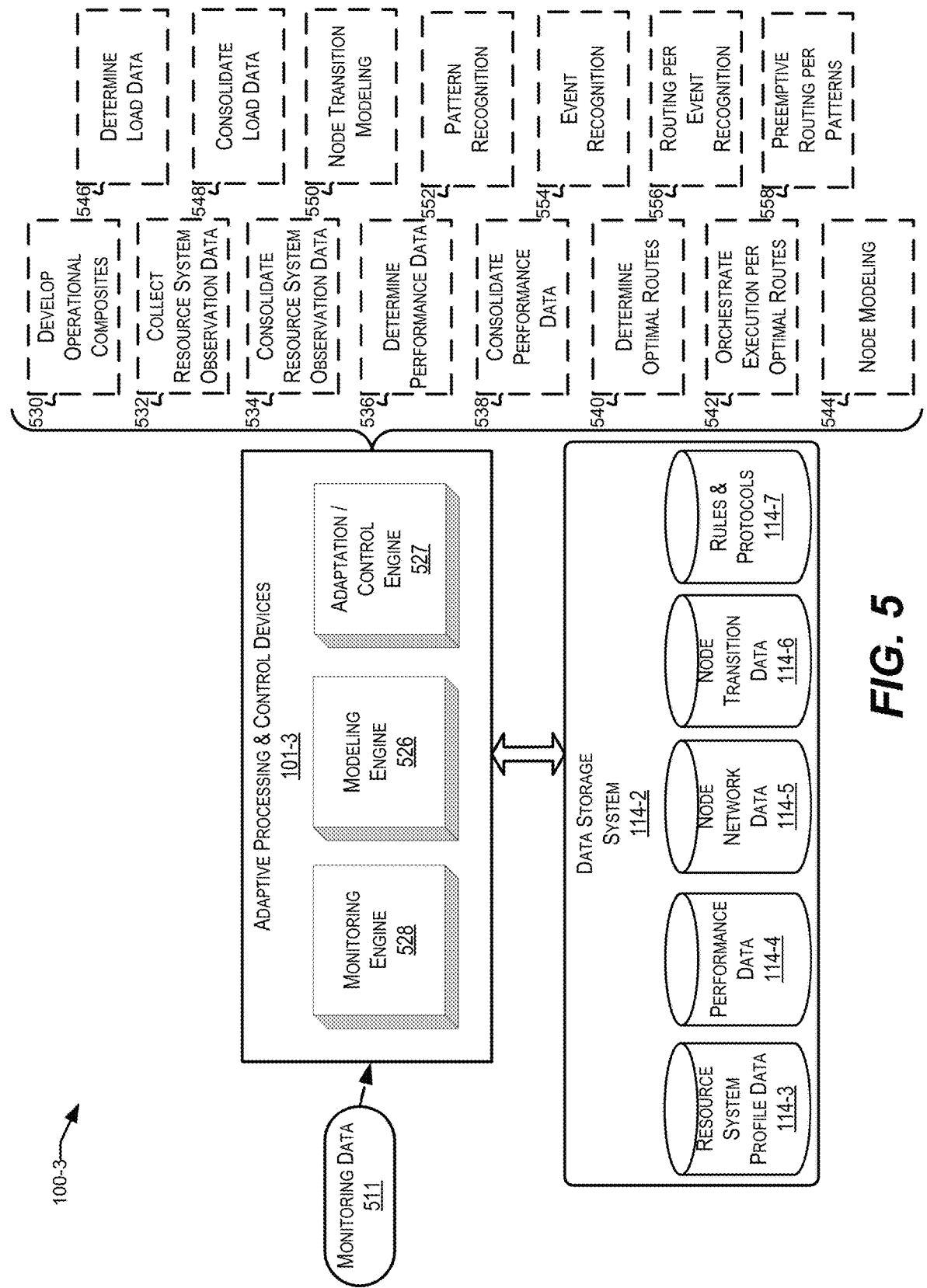
FIG. 5 illustrates a functional diagram for various embodiments of the network to facilitate adaptive and cooperative multi-system operations in conformance with smart routing protocols, in accordance with the present disclosure.

FIG. 5 illustrates a functional diagram for various embodiments of the network 100 to facilitate adaptive and cooperative multi-system operations in conformance with smart routing protocols, in accordance with the present disclosure. The system 101 may support cooperative multi-system operations of the one or more remote systems 103, one or more endpoint devices 106, and/or one or more agent devices 110. Various embodiments of networks 100 may be implemented and configured to perform secure transfers between one or more endpoint devices 106, agent devices 110, service provider systems 103, and/or system 101, with the system 101 coordinating operations of the endpoint devices 106, agent devices 110, and/or service provider systems 103 in conformance with dynamic protocols. In some embodiments, one or more of the systems 103, agent devices 110, and/or system 101 may be configured to provide secure transfers to the other components of the network 100.

Secure transfers may include transfers of one or a combination of various, different types of data items, credentials, codes, authorizations, services, requests, files, database records, content, resources, and/or the like. In some embodiments, the network 100 may be configured to operate as a resource transfer and/or access system by which users at endpoint devices 106 may initiate resource transfers and/or grant access to resources (e.g., one or more media of exchange) to one or a combination of systems 103, system 101, and/or users at other endpoint devices 106 in different locations, on different networks, and/or in different datacenters, etc. In some instances, an endpoint device 106 may cause a first secure transfer via a first system 103 that, in turn, causes one or more additional secure transfers via one or more additional systems 103. The system 101 may be configured to dynamically support, and ensure data security and integrity, of the secure transfers and other interactions of the service provider system 103 with the endpoint devices 106 and/or agent devices 110. In various embodiments, the system 101 may coordinate cooperative multi-system operations, via the one or more networks 120, of the service provider system 103 with the endpoint devices 106 and/or agent devices 110 that involve changing events, different endpoint devices 106 and/or agent devices 110 at different locations, changing accesses to resources, different service requests and service provisioning, etc., to ensure optimal routing of transfers.

The system 101 may include one or more monitoring engines 528 and/or one or more adaptation/control engines 527. The system 101 may be configured to use the one or more monitoring engines 528 and/or the one or more adaptation/control engines 527 to perform and cause various operations and processes with respect to resources as disclosed herein. Such operations and processes with respect to resources may include one or a combination of specifying, indicating, defining, and/or updating resource states; causing, performing, and/or coordinating operations/processes with respect to the resources, such as allocations and reallocations of resources, assignments and reassignments of resources, transfers of resources, deliveries of resources, and/or the like, instances of which may be referenced generally herein as "transfer" or "allocation" for the sake of description.

In various embodiments, the resource monitor 102C may include one or more monitoring engines 528 or may be separate from the one or more monitoring engines 528 and communicatively coupled to the one or more monitoring engines 528. The resource monitor 102C and/or the one or more monitoring engines 528 may monitor monitoring input 511. The resource monitor 102C and/or the one or more monitoring engines 528 may monitor electronic communications from the resource-controlling systems (e.g., systems 103) and/or monitoring devices corresponding to the resource-controlling systems to identify signals and data corresponding to: processes performed by the resource-controlling systems; resource capacities of resources controlled by the resource-controlling systems; states of the resource-controlling systems; states, values, and metrics of resources controlled and/or otherwise used by the resource-controlling systems; and/or the like. Such monitoring may be performed in real-time or near real-time. For example, in various embodiments, the resources controlled by resource-controlling systems may be, include, or otherwise correspond to processing resources, network resources, services, assets, bandwidth, capacities, availabilities, and computing/network equipment to provide one or combination of the foregoing, and/or the like. In various embodiments, based at least in part on the input 511, operations with respect to the resources, allocations and reallocations of resources, assignments and reassignments of resources, transfers of resources, deliveries of resources, and/or the like may be the load balanced, handled, coordinated, allocated, and/or otherwise controlled by the system 101 and may correspond to resource access requests and operations accumulated, otherwise received, processed, effected, and/or otherwise facilitated by the system 101. The system 101 (e.g., using the monitoring engine 528) may aggregate a plurality of data items at least in part by, for each electronic communication, processing the electronic communication to identify one or more digital identifiers uniquely mapped to one or more of the resource-controlling systems, and extracting and caching a data portion from the electronic communication. The monitoring engine 528 may consolidate the data portions and mapping the consolidated data portions to one or more resource-controlling system profile records that are stored in one or more data storages 114-3, performance data 114-4, node network data 114-5, node transition data 114-6, and/or the like.

The system 101 (e.g., with the resource monitor 102C and/or one or more monitoring engines 528 in various embodiments) may detect one or more system interactions from the monitoring input 511 that correspond to a defined event. The defined event may correspond to a device interaction or data change caused with respect to at least one remote system, at least one endpoint device, and/or at least one agent device. The defined event may correspond to a device interaction or data change caused with respect to the at least one system 103, a particular endpoint device 106, and/or a particular agent device 110. In an example session, an endpoint device 106 and/or agent device 110 may, for example, submit a set of one or more access requests to a system 103 and/or proxy server 108 as part of a particular session where one or more transfers are initiated. A service provider system 103 may be configured to receive and respond to requests from endpoint devices 106 and/or agent devices 110 as part of a particular session where one or more transfers are initiated. For example, the service provider system 103 may be configured to receive requests (e.g., in HTTP(s), REST, or another suitable protocol) from an endpoint device 106 or agent device 110 and respond with webpage data or mobile app data. Various instances of the set of one or more access requests may include credentials, codes, and/or verification information that may be used to determine whether resource access is to be granted, but additional constraints may be required depending on the context and a variety of factors, including locations of the service provider system 103, endpoint devices 106 and/or agent devices 110. The additional constraints may require additional data and data verification operations for particular access requests, transfers, and sessions. At the time of the transaction and/or session, the service provider system 103 may, in turn, transmit one or more requests to the system 101, along with self-identification and one or more identifiers of the use case. Thus, in the subsequent session, a protocol corresponding to the use case may allow for the system 101 to determine the contour of the session and the secure transfers requested within the session, where the contour is determined correspond to a defined event.

Consequent to the system 101 detecting one or more system interactions that correspond to a defined event, the system 101 may identify (e.g., with a modeling engine 526 and/or an adaptation/control engine 527 of the system 101) a protocol that comprises parameter constraints mapped to the defined event. In various embodiments, based at least in part on the monitoring data 511, the modeling engine 526 and/or the adaptation/control engine 527 may create and/or develop operational composites (530). In some embodiments, the creation/generation and/or development of operational composites (530) may be based at least in part on the modeling engine 526 and/or the adaptation/control engine 527 collecting resource-controlling system observation data (532) over time, consolidating the resource-controlling system observation data (534) collected over time, and/or forming/developing individualized resource system profiles 114-3 for each of the resource-controlling systems using the observation data. In some embodiments, the creation/generation and/or development of operational composites (530) may be based at least in part on the modeling engine 526 and/or the adaptation/control engine 527 determining performance data (536) mapped to individual resource-controlling systems, consolidating the performance data (538) collected over time, and/or developing the individualized resource system profiles 114-3 for each of the resource-controlling systems using the performance data. The system 101 may generate an implementation of the protocol with the modeling engine 526 and/or the control engine 527, the implementation of the protocol specifying an operational composite that defines one or more processes that are to occur in response to the detection of the defined event. The implementation of the protocol may transform the protocol into an executable process that applies to one or more resource-controlling systems. To facilitate the generation of implementations of protocols, the system 101 may use a protocol decision table 600.

Figure 6:
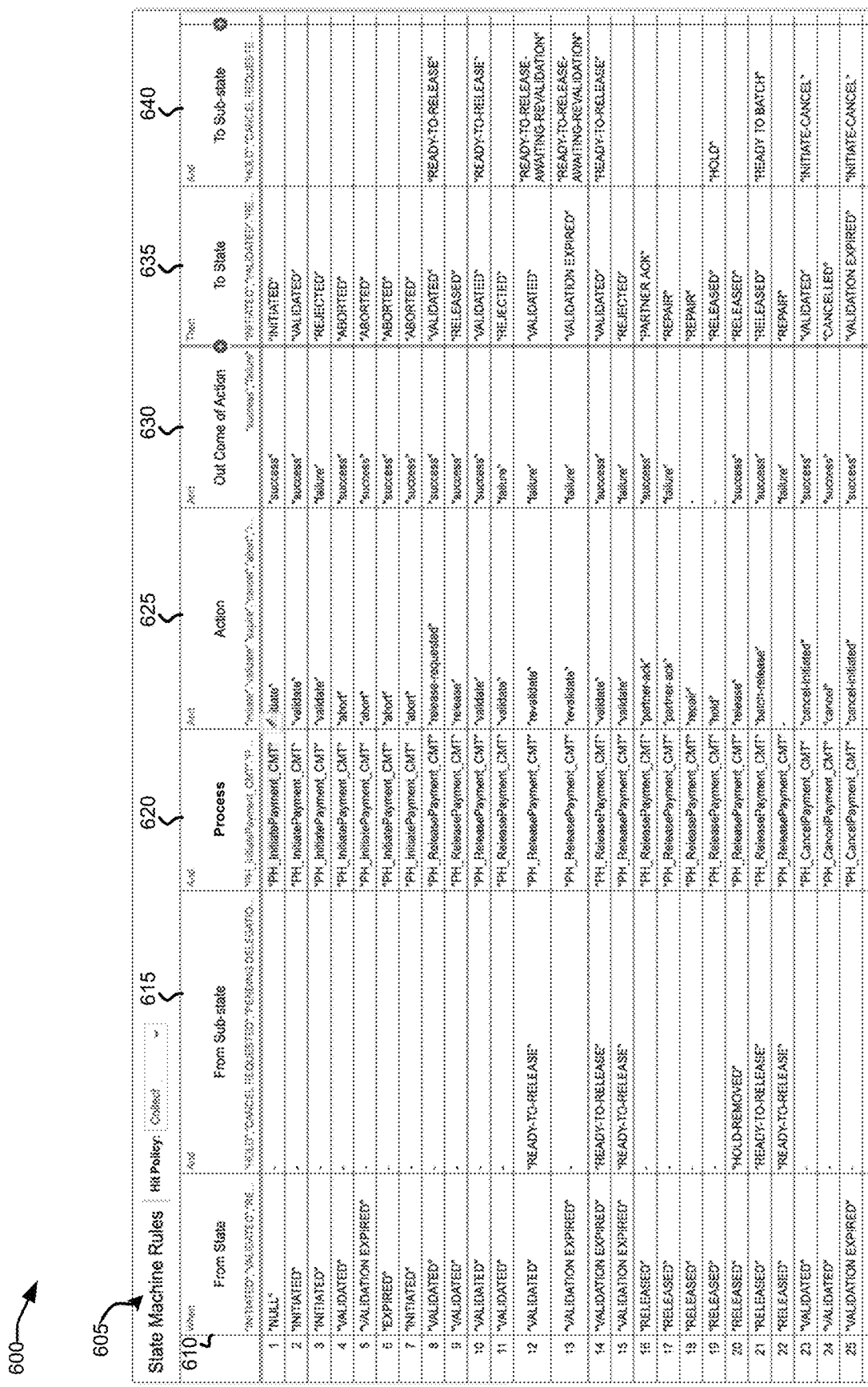
FIG. 6 illustrates a protocol decision table to facilitate adaptive and cooperative multi-system operations in conformance with smart routing protocols, in accordance with the present disclosure.

FIG. 6 illustrates a protocol decision table 600 to facilitate adaptive and cooperative multi-system operations in conformance with smart routing protocols, in accordance with the present disclosure. The protocol decision table 600 may correspond to specifications of mapped state machine rules 605, from states 610, substrates 615, processes 620, actions 625, outcomes 630, target operational states 635 and substates 640, metadata, transitional relationships between such aspects, and/or the like. The protocol decision table 600 may provide for dependency (e.g., cascading) rules. In various embodiments, the components of the protocol decision table 600 may be created and stored with data structures corresponding to one or more indexes, trees, arrays, matrices, and/or the like. The data structures may hierarchically order the plurality of data element definitions. Such a hierarchy could be a tree hierarchy with some embodiments. The ordering thereof may allow the system 101 to traverse the data structure. In various embodiments, indexing to facilitate data structures disclosed herein may be by way of specifications, links, and/or pointers or other references.

The system 101 (e.g., the modeling engine 526 and/or the control engine 527) may use the protocol decision table 600 to create the operational composite conforming to one or more smart routing protocols identified as function of the parameters of particular resource transfers and the current detections of the resource-controlling systems and resources needed for the particular transfers. The operational composite defined by the implementation of the protocol may be adapted to particular defined events, one or more resource-controlling systems, and/or the context identified by the system 101 per the monitoring and the determinations disclosed herein, which may include constraints required depending on the context of a particular transaction and/or session, and a variety of factors, including locations of the service provider system 103, endpoint devices 106 and/or agent devices 110 at the time of the session. The operational composite may include one or more process definitions identified as a function of the defined event and the monitoring and the determinations. In various embodiments, the operational composite may correspond to any one or combination of raw data, unstructured data, structured data, information, and/or content which may include media content, text, documents, files, instructions, code, executable code/files, images, video, audio, and/or any other suitable content suitable for embodiments of the present disclosure.

In various embodiments, the implementation of the determined protocol may include creating an operational composite to cause the executable process based at least in part on one or combination of the following. One or more process-performance locations may be identified based at least in part on the parameters of the requested transfer. One or more process-performance times (e.g., initiation times, completion times, speed of transfer, etc.) may be identified based at least in part on the parameters of the requested transfer. One or more process types of the one or more processes needed to effect the transfer maybe identified. Based at least in part on the one or more process types, one or more types of process-performing resources and/or process-controlling systems to serve transfers having one or more characteristics corresponding to the attributes of the requested transfer may be identified.

In various embodiments, based at least in part on the monitoring data 511, the modeling engine 526 and/or the adaptation/control engine 527 may collect resource-controlling system observation data (532) over time, may consolidate the resource-controlling system observation data (534) collected over time, and form/develop individualized resource system profiles 114-3 for each of the resource-controlling systems using the observation data. In various embodiments, based at least in part on the monitoring data 511 and the observation data, the modeling engine 526 and/or the adaptation/control engine 527 may determine performance data (536) mapped to individual resource-controlling systems, may consolidate the performance data (538) collected over time, and develop the individualized resource system profiles 114-3 for each of the resource-controlling systems using the performance data. Performance data may be accessed in real time for the monitoring and the determinations and/or from one or more previously developed and stored profiles for one or more resource-controlling systems, to identify, based at least in part on the performance data, availabilities, capacities, and process-performance durations that corresponds to one or more of the process types, the types of process-performing resource, the one or more process-performance locations, and/or the one or more process-performance times.

Accordingly the system 101 may collect, consolidate, and form performance data profiles 114-3 (e.g., patterns of performance determined by the system 101 based at least in part on the performance data for past transfers collected, consolidated, and analyzed over time) mapped to particular resource-controlling systems that the system 101 may use to select particular resource-controlling systems for particular transfers having particular characteristics at particular times, so that the selections are functions of the performance data mapped to the particular resource-controlling systems. One or more process assignments may be defined to be performed by one or more of the resource-controlling systems selected based at least in part on satisfying criteria corresponding to the availabilities, capacities, and process-performance durations. The system 101 may transmit, to at least one resource-controlling system of the one or more resource-controlling systems, at least a portion of the operational composite and/or corresponding instructions to cause the at least one resource-controlling system to allocate corresponding resources and perform the one or more processes in accordance with the operational composite. Such allocations and processes may include one or a combination of specifying, indicating, defining, and/or updating resource states; operations with respect to the resources, such as allocations and reallocations of resources, assignments and reassignments of resources, transfers of resources, deliveries of resources, and/or the like.

In various embodiments, based at least in part on the determined performance data (536) mapped to individual resource-controlling systems, the consolidated performance data (538), and/or the developed individualized resource system profiles 114-3 for each of the resource-controlling systems using the performance data, the modeling engine 526 and/or the adaptation/control engine 527 may determine optimal routes (540) and orchestrate execution of transfers per the optimal routes (542). As a part of such smart routing features, the modeling engine 526 may perform node modeling (544) of nodes (e.g., sets of one or more resource-controlling systems and/or resources) that the system 101 has monitored and caused to perform operations with respect to past transfers. The modeling may be based at least in part on the system 101 determining load data (546) corresponding to the respective nodes over time (e.g., with respect to past transfers) and consolidating the load data (548). The system 101 may not only model and profile particular nodes but may also model and profile the network of nodes, collecting and analyzing node network data 114-5 over time. The modeling engine 526 may use the node network data 114-5 to model node transitions (550) that correspond to various operational routes for transfers within the node network based at least in part on past transfers observed by the system 101. As part of the modeling, the modeling engine 526 may perform pattern recognition (552) to identify patterns with respect to particular nodes and node transitions. Based at least in part on the monitoring data 511 that the system may continually monitor, the modeling engine 526 may perform event recognition (554) of various events that may impact and/or have impacted past and current transfers. Accordingly, the modeling engine 526 and/or the control engine 527 may adapt current and future transfers based at least in part on the event recognition (554). Such adaptation may include routing as a function of the event recognition (556). Such adaptation may also include preemptive routing based at least in part on the patterns (558) recognized by the system 101. This may include system-identification of current patterns, past patterns, factors of past patterns that are recognized in current monitoring data and that are indicative of an imminent or otherwise forthcoming event that may impact transfers, and/or the like.

Figure 7:
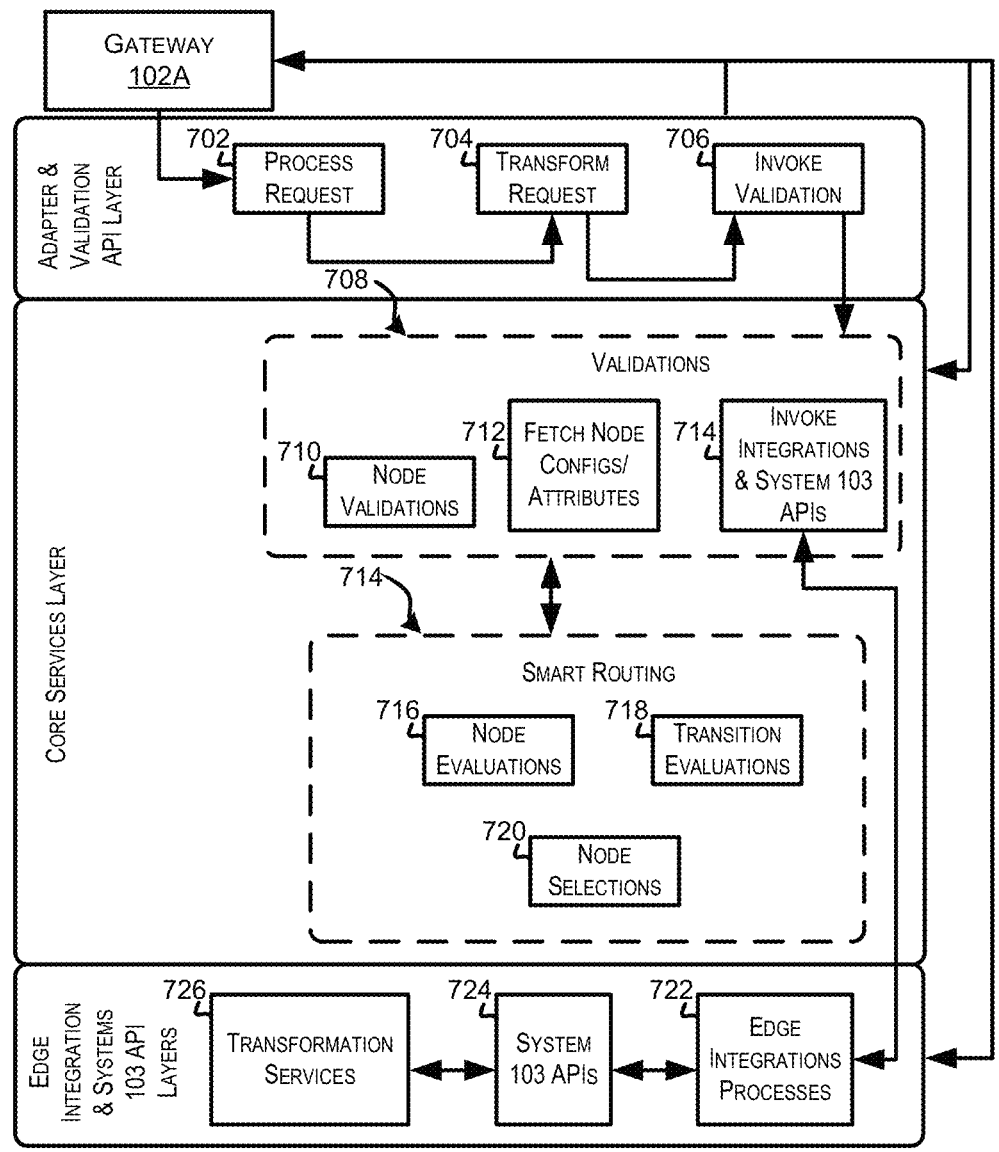
FIG. 7 illustrates a sequence flow diagram for resource-controlling system validation in conformance with smart routing protocols, in accordance with the present disclosure.

To illustrate one example implementation the smart routing features, FIG. 7 illustrates a flow diagram 700 for resource-controlling system validation in conformance with smart routing protocols, in accordance with the present disclosure. The flow diagram 700 should be understood as representing some, but not all, aspects of the methods and operations disclosed herein. Teachings of the present disclosure may be implemented in a variety of configurations. As such, the order of the aspects comprising the flow diagram 700 and/or other methods disclosed herein may be shuffled or combined in any suitable manner and may depend on the implementation chosen. Moreover, while some aspects may be separated for the sake of description, it should be understood that certain steps may be performed simultaneously or substantially simultaneously.

As indicated by 702, the system 101 may process requests for operations and processes with respect to resources, such as transfer requests. As indicated by 704, the system 101 may transform the requests, in some embodiments (e.g., using a SOAP adapter to transform the request to JSON). As indicated by 706, one or more validation processes may be invoked, which may include system 103 validation processes. As indicated by 708, a validation service of the system 101 may perform various validation processes, such as validating particular nodes (710) that may correspond to particular systems 103 and/or resources, fetching/pulling particular node configuration specifications and attributes (712), and/or invoking integrations and system 103 APIs (714). As indicated by 714, the system 101 may execute smart routing operations and processes disclosed herein with a smart routing service. Such smart routing features may include node evaluations 716, node transition evaluations 718, and/or node and route selections 720. Based at least in part on the system 101 determinations according to the smarting routing features, the system 101 may coordinate, orchestrate, instruct, and/or otherwise cause the resource transfers, which may include using system 103 APIs (724) and/or performing edge integration processes (722), which may provide for configurable edge integration based on standard data formats with flexibility to adapt at least in part by performing transformation services (726) that transform between internal system 101 data formats and processes and external service provider system 103 data formats and processes. This may involve the system 101 coordinating, orchestrating, instructing, and/or otherwise causing transfer processes with processing, specifying, and/or communicating service types, protocols, authentication information/keys/secrets, endpoint URLs, request transformation keys, response transformation keys, transaction data, payload encryption and flags, key encryption and flags, payload hash and flags, and/or the like.

The smart routing service of the system 101 may include a smart routing workflow as part of the validation of a resource-controlling system (e.g., a system 103). The smart routing workflow may include one or a combination of features disclosed herein in order to identify the optimal route, including one or more optimal resource-controlling systems, in view of the particular defined event and corresponding parameters of a requested transfer. As disclosed herein, the smart routing technology of the system 101 may facilitate cooperative multi-system operations to effect optimal routing transfers as a function of the changing needs and contexts of the service provider system 103, endpoint devices 106, and/or agent devices 110, including the monitoring and the determinations of performance data disclosed herein of: operating conditions, constraints, and/or states of one or more of the resource-controlling systems; the one or more metrics and/or constraints of one or more processes performed by one or more of the resource-controlling systems; one or more metrics, values, and/or constraints of one or more resources of the resource-controlling systems; and/or the like. The smart routing features of the system 101 may be provided without requiring changes to hardcoding, changes to templates, creation of new templates, or reconfiguring of the systems 103, which would be too numerous, time-consuming, and otherwise resource-consuming to support the different types of sessions, transfers, devices, systems, locations, and requirements that are supported by disclosed embodiments. By avoiding such changes to hardcoding, templates, and configurations, disclosed embodiments may provide for significant technological improvements in speed, flexibility, adaptability, and applicability of operations and functioning of systems and devices. Disclosed embodiments solve problems of conventional systems and devices being relatively slow, inflexible, and monolithic for secure transfers.

In various embodiments, the load-balancing server(s) 102, the smart router 102B, and/or the resource monitor may determine, based at least in part on the monitoring, one or more operating conditions, constraints, and/or states of one or more of the resource-controlling systems. Accordingly, by way of example, the system 101 may detect if and when a resource-controlling system is currently down, not operational, not responding, etc. due to technical issues, maintenance windows, regulatory actions (that may be specific to the resource-controlling system and/or jurisdiction, country, etc.), times of day, days, holidays, and/or the like. The system 101 may detect if and when certain services of a resource-controlling system are currently down, not operational, not responding, etc.

Additionally or alternatively, in various embodiments, the load-balancing server(s) 102, the smart router 102B, and/or the resource monitor may determine, based at least in part on the monitoring, one or more metrics and/or constraints of one or more processes performed by one or more of the resource-controlling systems. Accordingly, by way of example, the system 101 may detect parameters of the processes that the resource-controlling systems are able to perform, such as speed of operations, congestion with other processes, buffering times, availability to initiate processes, pendency of transactions of the processes, types of transfers able to be performed, types of formats corresponding to resource transfers, and/or the like. Additionally or alternatively, in various embodiments, the load-balancing server(s) 102, the smart router 102B, and/or the resource monitor may determine, based at least in part on the monitoring, one or more metrics, values, and/or constraints of one or more resources of the resource-controlling systems; and/or the like. Accordingly, by way of example, the system 101 may detect if and when the resources of a resource-controlling system are not available or where an allocation of resources conflicts with other commitments of the resources; insufficient resources in a system associated with the region of the resource-controlling system, associated with the system 101, and/or associated with a user of an endpoint device 106; and/or the like. In some instances, a resource-controlling system may control one or more portions of the network 120. The system 101 may detect if and when a network and/or a particular network route is currently down or experiencing slowness. With a given transfer per a defined event, the system 101 (e.g., the modeling engine 526) may evaluate resource-controlling systems and dynamically adapt the optimal route involving a subset of one or more of the resource-controlling systems for the type of transfer, purpose of the transfer, value of the transfer, originating system, sender, receiver, rules as a function of the foregoing, and/or the like, in view of the current route options which the system 101 determines based at least in part on the monitoring and the determinations. For instance, the operational composite may be a function of whether the transaction involves transferring resources to systems in different countries where the data points, risk checks, compliance checks, and security checks may be different for every country and may depend on whether a value of the transfer is greater than a particular threshold value and/or the like that each require different processes, resource-controlling systems, and/or resources. The system 101 (e.g., the modeling engine 526) may identify the subset of the resource-controlling systems is based at least in part on the modeling of the resource-controlling systems. The modeling may include determining one or more individual performance metrics mapped to the one resource-controlling systems. Each individual performance metric may be a function of the one or more identified protocols and at least some of the consolidated data portions collected by the monitoring engine 528. For each resource-controlling system, the system 101 may identify one or more protocols that include one or more parameter constraints according to specifications of process performance and/or operation performance. For a particular defined event, the system 101 may use at least one of the one or more individual performance metrics of at least one of the operation-performing resources to model one or more routes for effecting a transfer according to the protocol and the defined event. Based at least in part on the pattern of performance metrics, the system 101 may determine one or more variances attributed to one or more of the resource-controlling systems with respect to a baseline determined based at least in part on pattern recognition of performance metrics attributed to a plurality of the resource-controlling systems. Such variances may be evaluated by the system 101 to determine if the variances satisfy one or more thresholds of performance data. Based at least in part on the variances satisfying or not satisfying the one or more thresholds, the system 101 may eliminate one or more of the resource-controlling systems from the candidate pool and therefore the subset of resource-controlling system selected for potential operations and processes according to the system-identified routing for particular transfers.

The system 101 may surface any suitable information pertinent to the various processes disclosed herein to users via user interfaces and endpoint devices 106 and/or agent devices 110, and may allow for user input regarding the processes, including configuration specifications of resource-controlling systems of which adapting processes in conformance with smart routing protocols may be a function. Such adaptation may be performed in real-time or near real-time mode, during the transaction session with one or more systems 103. As part of the determination of optimal routing, the system 101 may select the subset of the resource-controlling systems at least partially as a function of the one or more operating conditions and/or the one or more metrics. By way of example, the selection may be based at least in part on resource-controlling systems available for a particular location, determining whether the resource-controlling systems accept the format of the resources with which the transfer needs to be sent, determining whether the resource-controlling systems have the bandwidth to allow transfer, determining whether the resource-controlling systems are operating at the particular time of the transaction session, determining which resource-controlling systems except the transfer based on any limitations on the principal amount.

The parameters of the defined event (identified, e.g., by the modeling engine 526) may include minimum performance metrics for the transfer. The system 101 (e.g., the modeling engine 526) may identify various routes using various resource-controlling systems and/or resources (i.e., nodes) that the requested transfer could take from beginning to end in order to complete the transfer. Accordingly, the modeling engine 526 may map specifications of nodes to particular routes. With the mapping of the potential node transition routes for the particular transfer, the modeling engine 526 may identify performance data for each of the nodes, each of which may be scored according to the performance data such that each score may add to an overall performance score for a particular route. The modeling engine 526 may rank the node transition routes according to the overall performance scores. Operational performance metrics of the nodes may include measurements with respect to one or more particular operations and/or processes performed by particular nodes (e.g., sets of one or more resource-controlling systems and/or resources). Such performance scores may be based at least in part on operational performance metrics, such as processing and/or node transition speeds needed by the nodes in order to perform the processes required by the transfer. Accordingly, the node transition routes may be scored as a function of speeds of transfer operations execution and such scoring may indicate the fastest node transition routes taken between two or more nodes, the slowest, and various categories in between. Thus, the modeling engine 526 may rank the node transition routes according to speed. Accordingly, the modeling engine 526 may rank the node transition routes according to speed metrics.

The one or more protocols may specify one or more processes for the particular resource to perform with respect to the particular load. Each of the one or more processes may include one or more operations, such as the identified one or more particular operations corresponding to the identified one or more operation types. The analysis of the subsets of the performance data may include identifying completion of a set of operations prescribed by the one or more protocols for the particular resource and the particular load (e.g., transfer). For example, the one or more protocols may specify target durations for performance of a particular operation of particular operation type. Accordingly, the analysis of the subsets the performance data may include analyzing time components of the subsets to determine one or more durations of one or more operation performances and compare the one or more durations to one or more specified target durations. The modeling engine 526 may calculate deltas between the performance times and durations of the one or more operations with respect to the specified target times and may assign speed scores as a function of the deltas. Similarly, the one or more protocols may specify target times of day, week, etc. that the operations of the particular operation type should be completed. Accordingly, the analysis of the subsets the performance data may include analyzing time components of the subsets to determine completion of one or more operations of one or more operation types in conformance with the specified target times. The modeling engine 526 may calculate deltas between the performance times and durations of the one or more operations with respect to the specified target times and may assign timeliness scores as a function of the deltas. Accordingly, the modeling engine 526 may select an optimal route for the particular load from the potential routes based at least in part on one or combination of the foregoing rankings and scores.

Disclosed embodiments may provide for learning, modeling, and matching transfers and nodes. Further, the learning, modeling, and matching transfers and nodes may include not only matching transfers to nodes responsive to currently detected context for the nodes, but also matching transfers to nodes based at least in part on predictions of context corresponding to the nodes, which predictions may be based on recognized patterns corresponding to the nodes. Disclosed embodiments may provide for inter-node path analytics and intra-node analytics. Various subsets of the nodes may be linked together in a node network as corresponding to particular routes. For example, from the consolidated node specifications, the system 101 may identify attributes of transitional relationships between two or more nodes and create and/or develop transitional links and transitional conditions and/or thresholds, and establish and/or adapt links between two or more network nodes in the network of nodes. The system 101 may perform inter-node path analytics and intra-node analytics based on analysis of many resource operations, resource histories, system histories, and attributes thereof. The system 101 may recognize and learn patterns to identify and analyze various routes from node to node, as well as the various types of attributes of the context detected at each node. Accordingly, the system 101 may learn context-aware node transition patterns for progression between nodes. The learning algorithms may differentiate and weight various path between nodes, and further recognize and rank the node transitions according to various node transition metrics (e.g., identifying a weighted path of assigned processes that can be taken in order to complete a particular transfer, the most common paths and assigned processes, the shortest routes, the fastest routes, the cheapest routes, the best routes for particular types of transfers, recipients, senders, locations, and/or the like).

Disclosed embodiments may further provide for performance tracking and modeling. The system 101 may track performance of transfer operations performed by resource-controlling systems. The system 101 may track operation performance from resource self-reporting input, updates pulled and/or pushed from resource-controlling systems, sensor data regarding system locations, load record data, auto-tracking of transfer operations, etc. Likewise, the system 101 may also track load metrics for comparison. All this data may be collected, aggregated, consolidated, transformed, and/or modeled by the system 101 in order to identify meaningful patterns and relationships of transfer, load, and resource-controlling systems operations, performance, and the like.

The monitoring engine 528 and/or the modeling engine 526 may include or otherwise correspond to an aggregation and transformation engine. The monitoring engine 528 may be configured to monitor the input 511 for any suitable aspects to facilitate improvements with routing and adaptation features disclosed herein. The monitoring engine 528 and/or the modeling engine 526 may facilitate one or more learning modes. The monitoring engine 528 and/or the modeling engine 526 may be configured to consolidate resource-controlling system profile data 114-3, performance data 114-4, network node data 114-5, and/or node transition data 114-6. The monitoring engine 528 may gather and process components input 511 to facilitate creation, development, and/or use of resource-controlling system profiles 114-3, which may include resource and resource allocation specifications, as well as performance data 114-4, which may include performance metrics pattern data, and node data 114-5, which may include node metrics, node metrics pattern data, and/or node specifications that correspond to various operational routes for transfers. For example, the monitoring engine 528 and/or the modeling engine 526 may gather, process, and generate data corresponding to the monitoring and the determinations disclosed herein to create and develop profiles 114-3 for the resource-controlling systems, which may be mapped to particular locations, regions, and jurisdictions (e.g., countries). Accordingly, in some embodiments, profiles 114-3 for the resource-controlling systems may be developed on a per-country (and/or other location) basis.

The node transition specifications and/or metrics may include specifications of which subsets of the nodes may be linked together in the node network. For example, only some of the nodes may be directly linked together. Some of the nodes may be indirectly linked together by way of one or more intermediate nodes. Some of the nodes may not be indirectly linked. As part of the development of node transition data 114-6, the learning algorithms of the modeling engine 526 may identify from the data 511 all node transition routes taken by resources and store corresponding node transition metrics with values, descriptors, flags, identifiers, and/or the like indicative of the node transition routes and corresponding resource specifications of the resources mapped to the node transition routes. On an ongoing basis, the modeling engine 526 may continue to develop the node transition metrics of at least some of the node transition routes as more data 511 indicates more instances of the node transition routes being taken.

The modeling engine 528 and/or the modeling engine 526 may include a reasoning module to make logical inferences from a set of the detected and differentiated data to infer one or more patterns corresponding to the resource-controlling system profile data 114-3, performance data 114-4, network node data 114-5, and/or node transition data 114-6. For instance, the pattern data may include information about node histories and any one or combination of corresponding identification histories, action and performance histories, location histories, resource allocation histories, and/or the like, any set of which may be used to derive one or more patterns of node data, which may include patterns of node transitions and node metrics, and corresponding patterns of performance data, which may include performance data for particular resource-controlling systems and/or resources mapped to the network nodes.

A pattern-based reasoner may be employed to use various statistical techniques in analyzing the data, both current and historical, in order to infer particularized pattern data from the data 511 and operational composites. A transitive reasoner could be employed to infer relationships from monitoring data 511 related to resource-controlling systems. For example, a transitive reasoner may be employed to infer relationships from a set of relationships to form the node data, node transition data, and performance data. In various embodiments, the system automatically establishes and develops the particularized pattern data. For example, patterns of performance data with respect to certain types of loads by certain resource-controlling systems may be determined. Such patterns may indicate variance with respect to timetables of certain resource-controlling systems and certain loads. As a result, scheduling buffers may be implemented to account for projected latency with respect to certain resource-controlling systems and certain types of loads based at least in part on determined patterns for the resource-controlling systems and types of loads. In some embodiments, the modeling engine 526 may be configured to employ deep learning to process the data 511 and derive the particularized pattern data corresponding to the resource-controlling system profiles 114-3, performance data 114-4, network node data 114-5, and/or node transition data 114-6. Accordingly, the modeling engine 526 may facilitate machine learning or, more specifically, deep learning, to facilitate creation, development, and/or use of particularized pattern data that may include node metrics, node transition metrics, and performance metrics.

Thus, in various embodiments, the modeling engine 526 and/or the adaptation/control engine 527 may orchestrate the control of loads, resource-controlling systems, and/or resources according to the particularized modeling, and may identify utilize optimized routing schemes based at least in part on the evaluating transfer parameters against the modeling. The monitoring engine 528 may monitor variables, and the modeling engine 526 may utilize feedback loops and learning algorithms to dynamically analyze persistence information over time and generate corrections and adaptations. The modeling engine 526 may learn differences from projections over time (e.g., factoring into the determinations periodic differences) and may calibrate over time. The feedback could be used for training the system to heuristically adapt conclusions, profiles, correlations, attributes, triggers, patterns, and/or the like.

In some embodiments, the system 101 may utilize keyword recognition and message analysis to identify alert conditions with respect to geopolitical and/or environmental news information gathered from data source systems monitored by the monitoring engine 528. Likewise, in some embodiments, the system 101 may identify alert conditions with respect to gathered news information that is specific to a particular resource-controlling system that is negative and/or otherwise potentially disruptive. Certain embodiments may provide for keyword processing of event data, and resource assessments may be based at least in part on keyword identification of event data. In some embodiments, the monitoring engine 528 could process event data for keyword identification to recognize content/data that is evidence of an environmental event of significance and/or a geo-political event of significance (e.g., a status of civil unrest). Certain keywords may be indicia of such events. The monitoring engine 528 may identify keywords as distinctive markings and may compile the keywords for the purposes of characterizing an event. The keywords could be correlated with keyword criteria to characterize the event. The keyword criteria could include keywords identified by words, word stems, phrases, word groupings, and/or like keyword information, with weighting assigned thereto. A keyword could be assigned a weight according to its significance. Increased word weights could be tied to increasing probability of an event of significance. A greater number of corroborating news reports corresponding to location could be recognized and be tied to increasing probability of an event of significance. The keyword criteria could correspond to one or more keyword schemas that are correlated to various event scenarios. Recognized keywords of news reports, for example, could be matched with one or more keyword schemas and correlated to particular event scenarios. In some embodiments, a keyword schema could include word collections of strong indicators, weak indicators, and neutral indicators, that is, keyword information indicative of an event of significance. Within each collection, various words could be assigned various weights according to their significance. Such word collections could be implemented in any suitable manner, including word lists, word tables, matrices, and/or the like. Some embodiments may have keywords organized according to decision tree, with contingencies so that only certain combinations of keywords may be considered. For example, certain keywords could only have significance if used in conjunction with other keywords, and/or not in conjunction with others. Based at least in part on the characterization of the events, impacted locations may be identified and resource-controlling systems associated with the impacted locations may be identified and may be defined in terms of geographic coordinates, cities, towns, states, provinces, districts, counties, zip codes, territories, countries, distances from points of reference, direction with respect to points of reference and/or lines of reference, etc.

In some embodiments, the modeling engine 526 may qualify various resource-controlling systems and/or routes according to a categorization scheme. By way of example, the categorization scheme could include categories such as: extreme load imbalance, high risk, and/or high probability of highly disruptive event, system outage or failure to meet performance criteria; significant load imbalance, moderate risk, and/or moderate probability of disruptive event, system outage or failure to meet performance criteria; low load imbalance, low risk, and/or low probability of disruptive event, system outage or failure to meet performance criteria; no significant loading balance, negligible risk, and/or minimal potential for disruptive event, system outage or failure to meet performance criteria; and/or the like. The criteria for qualifying load may specify rules and thresholds for various types of load data. For example, criteria for qualifying loads may specify rules and thresholds based at least in part on any one or combination of: historical, current, and/or projected event/performance data and/or availability assessments for resource-controlling systems and/or locations of resource-controlling systems; patterns of performance data for resource-controlling systems mapped to various load types (e.g., types of transfers and corresponding transfer parameters); and/or other factors disclosed herein. In some embodiments, qualification could entail a scoring system where loads are scored according to any one or combination of the various factors disclosed herein. The scoring system could be correlated to the category scheme in some embodiments, such that certain scores correspond to certain categories. Some embodiments may score loads with numerical expression. By way of example, a load scoring scale could include a range of load scores from 0 to 100, or from 0 to 1,000, with the high end of the scale. However, other embodiments may employ a reverse scale where the lower scores indicate greater risk etc. Some embodiments may use methods of statistical analysis to derive a score.

The above methods may be implemented by computer-program products that direct a computer system to control the actions of the above-described methods and components. Each such computer-program may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random-access memory (RAM) and non-volatile storage drive (e.g., disk drive, optical drive, solid state drive), which are forms of tangible computer-readable memory.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "storage medium," "storage media," "computer-readable medium," "computer-readable media," "processor-readable medium," "processor-readable media," and variations of the term may represent one or more devices for storing data, including read only memory (ROM), random access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory, computer-readable medium such as a storage medium. Processors may perform the described tasks.

While the principles of the disclosure have been described above in connection with specific apparatuses and methods, it is to be clearly understood that this description is made only by way of example and not as limitation on the scope of the disclosure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Furthermore, while the figures depicting mechanical parts of the embodiments are drawn to scale, it is to be clearly understood as only by way of example and not as limiting the scope of the disclosure.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

While the principles of the disclosure have been described above in connection with specific apparatuses and methods, it is to be clearly understood that this description is made only by way of example and not as limitation on the scope of the disclosure.

What is claimed:

1. A system comprising:
    one or more processing devices and memory communicatively coupled with and readable by the one or more processing devices, the memory comprising processor-readable instructions which, when executed by the one or more processing devices, cause the system to perform operations comprising:
        identifying one or more signals based at least in part on one or more electronic communications received via one or more interfaces, the one or more signals corresponding to:
            one or more processes performed by resource-controlling systems,
            one or more resource capacities of resources controlled by the resource-controlling systems, and/or
            one or more states of the resource-controlling systems;
        identifying a protocol based at least in part on the one or more signals;
        determining one or more operating conditions of one or more of the resource-controlling systems and/or one or more metrics of a first set of one or more processes performed by one or more of the resource-controlling systems;
        identifying a subset of the resource-controlling systems based at least in part on the one or more operating conditions and/or the one or more metrics; and
        causing at least one resource-controlling system of the subset of the resource-controlling systems to perform a second set of one or more processes and/or allocate one or more resources in accordance with the protocol.

2. The system as recited in claim 1, where the causing the at least one resource-controlling system to perform the second set of one or more processes and/or allocate the one or more resources corresponds to transmitting instructions to the at least one resource-controlling system of the subset of the resource-controlling systems.

3. The system as recited in claim 2, where the operations further comprise:
    generating an implementation of the protocol, the implementation of the protocol defining an operational composite.

4. The system as recited in claim 3, where the instructions cause the at least one resource-controlling system to perform the second set of one or more processes and/or allocate the one or more resources in accordance with the operational composite.

5. The system as recited in claim 4, where the operations further comprise:
    learning a pattern of performance metrics mapped to the resource-controlling systems.

6. The system as recited in claim 5, where the identifying the subset of the resource-controlling systems is based at least in part on the pattern of performance metrics.

7. The system as recited in claim 6, where the operations further comprise:
    developing one or more resource-controlling system profile records based at least in part on one or more electronic communications; and
    using at least one of the one or more resource-controlling system profile records to model the at least one resource-controlling system, the modeling comprising determining one or more individual performance metrics mapped to the at least one resource-controlling system.

8. One or more non-transitory, machine-readable media having machine-readable instructions thereon which, when executed by one or more processing devices, cause a system to perform operations comprising:
    identifying one or more signals based at least in part on one or more electronic communications received via one or more interfaces, the one or more signals corresponding to:
        one or more processes performed by resource-controlling systems,
        one or more resource capacities of resources controlled by the resource-controlling systems, and/or
        one or more states of the resource-controlling systems;
    identifying a protocol based at least in part on the one or more signals;
    determining one or more operating conditions of one or more of the resource-controlling systems and/or one or more metrics of a first set of one or more processes performed by one or more of the resource-controlling systems;
    identifying a subset of the resource-controlling systems based at least in part on the one or more operating conditions and/or the one or more metrics; and
    causing at least one resource-controlling system of the subset of the resource-controlling systems to perform a second set of one or more processes and/or allocate one or more resources in accordance with the protocol.

9. The one or more non-transitory, machine-readable media as recited in claim 8, where the causing the at least one resource-controlling system to perform the second set of one or more processes and/or allocate the one or more resources corresponds to transmitting instructions to the at least one resource-controlling system of the subset of the resource-controlling systems.

10. The one or more non-transitory, machine-readable media as recited in claim 9, where the operations further comprise:
   generating an implementation of the protocol, the implementation of the protocol defining an operational composite.

11. The one or more non-transitory, machine-readable media as recited in claim 10, where the instructions cause the at least one resource-controlling system to perform the second set of one or more processes and/or allocate the one or more resources in accordance with the operational composite.

12. The one or more non-transitory, machine-readable media as recited in claim 11, where the operations further comprise:
   learning a pattern of performance metrics mapped to the resource-controlling systems.

13. The one or more non-transitory, machine-readable media as recited in claim 12, where the identifying the subset of the resource-controlling systems is based at least in part on the pattern of performance metrics.

14. The one or more non-transitory, machine-readable media as recited in claim 13, where the operations further comprise:
   developing one or more resource-controlling system profile records based at least in part on one or more electronic communications; and
   using at least one of the one or more resource-controlling system profile records to model the at least one resource-controlling system, the modeling comprising determining one or more individual performance metrics mapped to the at least one resource-controlling system.

15. A method comprising:
   identifying one or more signals based at least in part on one or more electronic communications received via one or more interfaces, the one or more signals corresponding to:
      one or more processes performed by resource-controlling systems,
      one or more resource capacities of resources controlled by the resource-controlling systems, and/or
      one or more states of the resource-controlling systems;
   identifying a protocol based at least in part on the one or more signals;
   determining one or more operating conditions of one or more of the resource-controlling systems and/or one or more metrics of a first set of one or more processes performed by one or more of the resource-controlling systems;
   identifying a subset of the resource-controlling systems based at least in part on the one or more operating conditions and/or the one or more metrics; and
   causing at least one resource-controlling system of the subset of the resource-controlling systems to perform a second set of one or more processes and/or allocate one or more resources in accordance with the protocol.

16. The method as recited in claim 15, where the causing the at least one resource-controlling system to perform the second set of one or more processes and/or allocate the one or more resources corresponds to transmitting instructions to the at least one resource-controlling system of the subset of the resource-controlling systems.

17. The method as recited in claim 16, further comprising:
   generating an implementation of the protocol, the implementation of the protocol defining an operational composite.

18. The method as recited in claim 17, where the instructions cause the at least one resource-controlling system to perform the second set of one or more processes and/or allocate the one or more resources in accordance with the operational composite.

19. The method as recited in claim 18, further comprising:
   learning a pattern of performance metrics mapped to the resource-controlling systems.

20. The method as recited in claim 19, where the identifying the subset of the resource-controlling systems is based at least in part on the pattern of performance metrics.

* * * * *